(12) United States Patent
Aio et al.

(10) Patent No.: US 11,997,747 B2
(45) Date of Patent: May 28, 2024

(54) COMMUNICATION DEVICE AND COMMUNICATION METHOD

(71) Applicant: Sony Group Corporation, Tokyo (JP)

(72) Inventors: Kosuke Aio, Tokyo (JP); Yusuke Tanaka, Tokyo (JP); Shigeru Sugaya, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 422 days.

(21) Appl. No.: 17/296,554

(22) PCT Filed: Nov. 19, 2019

(86) PCT No.: PCT/JP2019/045192
§ 371 (c)(1),
(2) Date: May 25, 2021

(87) PCT Pub. No.: WO2020/144940
PCT Pub. Date: Jul. 16, 2020

(65) Prior Publication Data
US 2022/0030412 A1 Jan. 27, 2022

(30) Foreign Application Priority Data
Jan. 8, 2019 (JP) .................... 2019-001052

(51) Int. Cl.
*H04W 4/00* (2018.01)
*H04L 5/00* (2006.01)
(Continued)

(52) U.S. Cl.
CPC .......... *H04W 8/005* (2013.01); *H04L 5/0007* (2013.01); *H04W 48/16* (2013.01); *H04W 84/12* (2013.01)

(58) Field of Classification Search
CPC ..... H04W 74/04; H04W 8/005; H04W 84/12; H04W 84/18; H04L 5/007
(Continued)

(56) References Cited

U.S. PATENT DOCUMENTS 10,075,270 B2* 9/2018 Yerramalli ............. H04L 5/005
2012/0026941 A1* 2/2012 Ahmad ................. H04W 48/16
370/328
(Continued)

FOREIGN PATENT DOCUMENTS

CN 101772980 A 7/2010
CN 102742309 A 10/2012
(Continued)

OTHER PUBLICATIONS

International Search Report and Written Opinion dated Dec. 24, 2019, received for PCT Application PCT/JP2019/045192, Filed on Nov. 19, 2019, 11 pages including English Translation.
(Continued)

*Primary Examiner* — Marceau Milord
(74) *Attorney, Agent, or Firm* — XSENSUS LLP

(57) ABSTRACT

A communication device shortening a scanning time of a communication terminal is provided. A communication device functioning as an access point includes: a first signal processing unit generating a first signal of which a subordinate communication terminal is notified; a second signal processing unit generating a second signal which includes information regarding the first signal and of which a communication terminal before connection is notified; and a communication unit simultaneously transmitting the first and second signals. The second signal includes information regarding a channel to be used to transmit the first signal and further includes at least one piece of information among a transmission length of the second signal, a transmission
(Continued)

length of the first signal, and the number of times the second signal is repeated.

11 Claims, 25 Drawing Sheets

(51) Int. Cl.
  *H04W 8/00* (2009.01)
  *H04W 48/16* (2009.01)
  *H04W 84/12* (2009.01)
(58) Field of Classification Search
  USPC .......................................................... 370/329
  See application file for complete search history.

(56) References Cited

U.S. PATENT DOCUMENTS

| | | | | |
|---|---|---|---|---|
| 2013/0059614 | A1* | 3/2013 | Kannan | H04W 72/563 455/500 |
| 2013/0142132 | A1 | 6/2013 | Kim | |
| 2014/0086200 | A1* | 3/2014 | Seok | H04L 5/0096 370/330 |
| 2014/0334435 | A1* | 11/2014 | Al-Shalash | H04W 8/005 370/330 |
| 2016/0234757 | A1* | 8/2016 | Somasundaram | H04W 48/08 |
| 2017/0208546 | A1 | 7/2017 | Park et al. | |
| 2018/0115996 | A1* | 4/2018 | Si | H04W 74/0808 |
| 2019/0141708 | A1* | 5/2019 | Chen | H04W 72/0453 |
| 2019/0306923 | A1* | 10/2019 | Xiong | H04J 13/0062 |
| 2020/0100284 | A1* | 3/2020 | Li | H04W 74/0808 |
| 2020/0162931 | A1* | 5/2020 | Chakraborty | H04W 48/12 |
| 2020/0187250 | A1* | 6/2020 | Bhattad | H04W 16/28 |
| 2021/0037397 | A1* | 2/2021 | Guo | H04W 72/046 |

FOREIGN PATENT DOCUMENTS

| | | |
|---|---|---|
| CN | 104662987 A | 5/2015 |
| CN | 104919828 A | 9/2015 |
| CN | 104969588 A | 10/2015 |
| CN | 105165070 A | 12/2015 |
| JP | 2009-272941 A | 11/2009 |
| JP | 2013121091 A | 6/2013 |
| JP | 2017-28746 A | 2/2017 |
| JP | 2017-121084 A | 7/2017 |
| JP | 2017-143559 A | 8/2017 |
| JP | 2017200233 A | 11/2017 |
| JP | 2018014574 A | 1/2018 |
| WO | 2011/106538 A1 | 9/2011 |
| WO | WO-2017023006 A1 | 2/2017 |

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications", IEEE Standards Association, IEEE Std 802.11-2016 (Revision of IEEE Std 802.11-2012), Dec. 14, 2016, 3534 pages, XP068113034.
Alfred Asterjadhi, et al. (Qualcomm Inc), "Discovery Channels for 6 GHz band", IEEE Draft; doc.: IEEE 802.11-18/1624r0, IEEE, Sep. 11, 2018, 11 pages, XP068128963.
Alfred Asterjadhi, "Discovery Channels For 6 GHz Band", IEEE 802.11-18A624r0, Aug. 20, 2018, 11 pgs.
International Standard-Information Technology—Telecommunications and information exchange between systems Local and metropolitan area networks—Specific requirements Part 11: Wireless LAN Medium Access Control (MAC) and Physical Layer (PHY) Specifications, IEEE Std 802.11-21-2012, IEEE, ISO IEC IEEE, 2738 pgs.

* cited by examiner

COMMUNICATION DEVICE AND COMMUNICATION METHOD

CROSS-REFERENCE TO RELATED APPLICATIONS

The present application is based on PCT filing PCT/JP2019/045192, filed Nov. 19, 2019, which claims priority to JP 2019-001052, filed Jan. 8, 2019, the entire contents of each are incorporated herein by reference.

TECHNICAL FIELD

A technology disclosed in the present specification relates to a communication device and a communication method for transmitting and receiving a wireless signal.

BACKGROUND ART

In wireless local area network (LAN) systems, technologies for selecting channels to be used by access points, causing communication terminals to scan all the channels, and searching for access points located nearby have been used. The communication terminals can transmit probe requests to the access points without scanning channels, receive probe responses from the access points operating at the channels, and acquire information regarding networks.

In recent years, environments in which countless access points are located nearby have been fostered with the explosive proliferation of wireless LAN systems, and thus frequency channel resources have been depleted. For example, a 6-GHz band is assumed to be newly used in addition to a 5-GHz band used in the related art in wireless LAN systems. Incidentally, when communication terminals transmit radio waves freely, there is concern of interference in nearby systems since the new frequency band operates while primary business systems are already operated.

To protect the existing primary business systems, a case in which communication terminals abstain from transmitting signals spontaneously can be considered. In this case, a communication terminal that conforms with the IEEE 802.11 standard is not able to perform active scanning to discover a nearby access point by transmitting a probe request, and thus has to discover a beacon signal transmitted by the access point while scanning a plurality of channels which are located in a broadband one by one. In this way, shortening a scanning time of a communication terminal can be said to be a big problem of a wireless LAN.

A scheme of shortening a scanning time of a communication terminal by causing an access point to transmit a scanning signal different from a beacon signal is considered. For example, a method of enabling discovery of presence of an access point even in a state in which a communication terminal scans only a certain specific channel by causing the access point to transmit a discovery beacon at a period shorter than a beacon interval and performing frequency hopping of the signal periodically has been proposed (see PTL 1).

Normally, when a communication terminal switches a channel at which scanning is performed, it is necessary to scan only a beacon interval at least at each channel. On the other hand, when an access point switches a frequency of a scanning signal, a signal can be transmitted at a shorter interval. Therefore, it is possible to shorten a scanning time.

CITATION LIST

Patent Literature

[PTL 1]
JP 2017-28746 A

SUMMARY

Technical Problem

An object of the technology disclosed in the present specification is to provide a communication device operating as an access point or a communication terminal and a communication method in a network in which one or more communication terminals are connected to an access point for operation.

Solution to Problem

According to a first aspect of the technology disclosed in the present specification, a communication device includes:
 a first signal processing unit configured to generate a first signal;
 a second signal processing unit configured to generate a second signal including information regarding the first signal; and
 a communication unit configured to simultaneously transmit the first and second signals.

In the communication device according to the first aspect, the communication device may function as an access point in a wireless network. The first signal processing unit may generate the first signal of which a subordinate communication terminal is notified.

The second signal processing unit may generate the second signal of which a communication terminal before connection is notified.

The second signal includes information regarding channels used to transmit the first signal and further includes at least one piece of information among a transmission length of the second signal, a transmission length of the first signal, and the number of times the second signal is repeated. Accordingly, another communication device can specify channels used to transmit the first signal by scanning any channel and receiving the second signal. Thus, it is possible to shorten a time until the first signal is received from the communication device according to the first aspect.

According to a second aspect of the technology disclosed in the present specification, a communication method includes:
 a first signal-processing step of generating a first signal;
 a second signal-processing step of generating a second signal including information regarding the first signal; and
 a communication step of simultaneously transmitting the first and second signals.

According to a third aspect of the technology disclosed in the present specification, a communication device includes:
 a communication unit configured to transmit and receive a wireless signal at one of a plurality of frequency channels;
 a control unit configured to control switching of a channel to be transmitted and received by the communication unit;
 a second processing unit configured to process a second signal received from another communication device and acquire information regarding a usage channel of the communication device; and a first processing unit configured to process a first signal received from the other communication device and acquire information regarding the other communication device. The control unit performs standby of the first signal at the usage channel specified based on the second signal.

According to a fourth aspect of the technology disclosed in the present specification, a communication method includes:

processing a second signal received from another communication device and acquiring information regarding a usage channel of the other communication device;

performing standby of a first signal at the usage channel specified based on the second signal; and processing the first signal received from the other communication device and acquiring information regarding the other communication device.

Advantageous Effects of Invention

According to the technology disclosed in the present specification, it is possible to provide a communication device operating as an access point or a communication terminal so that a scanning time of the communication terminal can be shortened and a communication method.

According to the technology disclosed in the present specification, since the access point transmits the discovery signal including information used to specify a usage channel using a channel other than the usage channel, the communication terminal can efficiently search for an access point by performing a scanning operation on any channel.

According to the technology disclosed in the present specification, the access point transmits a discovery signal and a beacon signal as one wireless signal (one OFDM signal), and thus can allocate a plurality of discovery signals to channels other than the usage channel and transmits the discovery signals. Thus, it is possible to shorten a scanning time of the communication terminal.

According to the technology disclosed in the present specification, since the discovery signal and the beacon signal are transmitted as one wireless signal, the access point can simultaneously transmit the discovery signal and the beacon signal with a simple device configuration. Thus, the communication terminal can also detect the discovery signal with a simple device configuration.

The advantageous effects described in the present specification are merely exemplary and the advantageous effects of the present invention are not limited thereto. In addition to the foregoing advantageous effects, further additional advantages effects can be obtained in the present invention.

Other objectives, features, and advantageous effects of the technology disclosed in the present specification will be apparent from the further detailed description based on the embodiments to be described below and the appended drawings.

DESCRIPTION OF EMBODIMENTS

Hereinafter, embodiments described in the present specification will be described in detail with reference to the drawings.

In the present specification, a technology for enabling more efficient transmission of a scanning signal with a simpler device configuration will be proposed below. The scanning signal is a signal that includes information used to specify usage channels of an access point, is transmitted mainly using channels other than the usage channel, and is referred to as a "discovery signal" below. Specifically, the access point allocates a plurality of discovery signals to channels other than the usage channel and enables transmission by generating a discovery signal and a beacon signal as single orthogonal frequency division multiplexing (OFDM) with one transmitter. Further, even when the number of channels at which the discovery signal can be disposed is small due to a constraint on transmission power of the transmitter, the access point enables shortening of a scanning time of a communication terminal by performing channel switching of the discovery signal in the OFDM signal.

Figure 1:
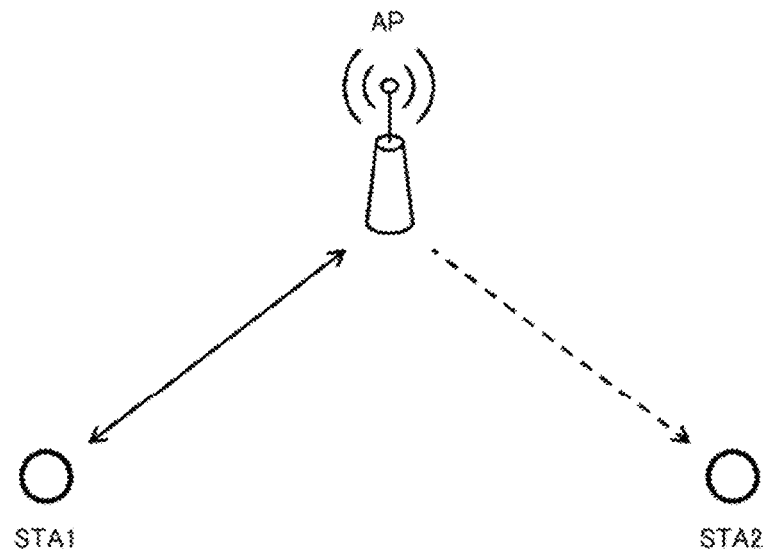
FIG. 1 is a diagram illustrating a configuration example of a communication system.

FIG. 1 illustrates a configuration example of a communication system that transmits and receives a wireless signal. The illustrated communication system includes one access point (AP) and two communication terminals (STA). In the drawing, one communication terminal (STA1) is connected to a basic service set (BSS) operated by the access point, and the other communication terminal (STA2) is scanning a nearby access point without being connected to any access point.

In the communication system, for example, it is assumed that a plurality of frequency channels including the 6 GHz band can be used in addition to the 5 GHz band. Here, the 6 GHz band is already operated by a primary business system, and there is a possibility of usable frequency channels varying. The access point sets one usage channel among usable frequency channels and transmits a beacon signal to subordinate communication terminals on the usage channels. In the embodiment to be described below, the access point transmits a discovery signal using a channel other than the usage channel.

Application targets of the technology proposed in the present specification are not limited to the system configuration illustrated in FIG. 1. There may be a plurality of communication devices of which connection is established and a condition that nearby terminals are located near each communication device is satisfied. As long as the condition is satisfied, a positional relation between communication terminals does not particularly matter.

Figure 2:
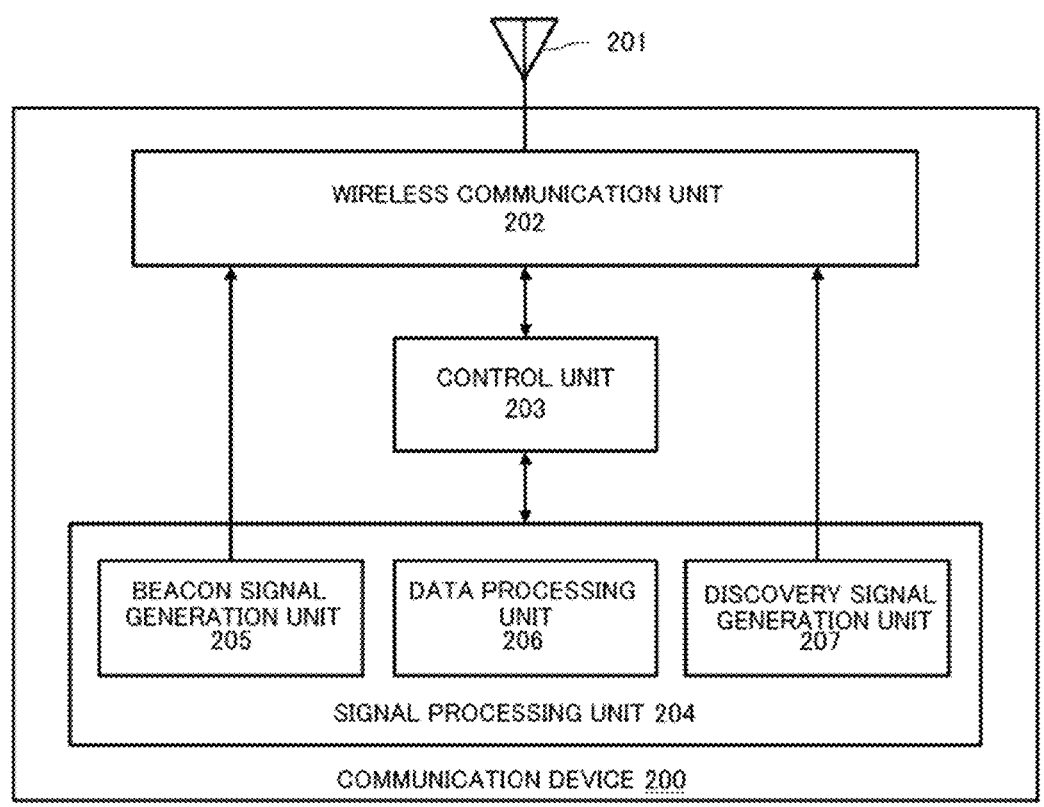
FIG. 2 is a diagram illustrating a functional configuration example of a communication device 200 operating as an access point.

FIG. 2 schematically illustrates a functional configuration example of the communication device 200 operating as an access point. The illustrated communication device 200 includes an antenna 201, a wireless communication unit 202, a control unit 203, and a signal processing unit 204.

The control unit 203 generally controls the entire device such that the communication device 200 operates as the access point. In the embodiment, the control unit 203 determines a transmission time and a transmission channel for a beacon signal or a discovery signal, or the like.

The signal processing unit 204 performs processing on signals transmitted and received via the wireless communication unit 202. In the embodiment, the signal processing unit 204 includes a beacon signal generation unit 205 that generates a beacon signal, a data processing unit 206 that performs processing on a data signal for performing communication, and a discovery signal generation unit 207 that generates a discovery signal. The beacon signal generation unit 205 and the discovery signal generation unit 207 each have a role of exchanging a bit sequence of information of which the communication terminal is notified with the wireless communication unit 202.

The beacon signal includes, for example, information necessary for connection (association) to a wireless network (BSS) operated by the access point and is transmitted using a usage channel of the access point. The beacon signal may have a frame format conforming with, for example, a known wireless LAN standard such as IEEE 802.11 and detailed description thereof will be omitted herein.

The discovery signal is a signal that includes information used to specify a usage channel of the access point and is transmitted using a channel other than the usage channel. The discovery signal can further include other information such as a transmission length of a discovery signal or a beacon signal. The details will be described later.

In signal transmission, the wireless communication unit 202 generates an OFDM signal from the information of the bit sequence generated by the signal processing unit 204, performs analog converting and radio frequency (RF) processing, and generates a transmission signal to be output from the antenna 201. In the embodiment, the wireless communication unit 202 is configured to generate one wireless signal (one OFDM signal) in which a beacon signal and a discovery signal are allocated to different frequency channels and simultaneously transmit the beacon signal and the discovery signal. Specifically, based on the information received from the control unit 203, the wireless communication unit 202 disposes the beacon signal and the discovery signal in specific channels and further generates a wireless signal in which null signals are disposed at channels at which neither is disposed.

Figure 3:
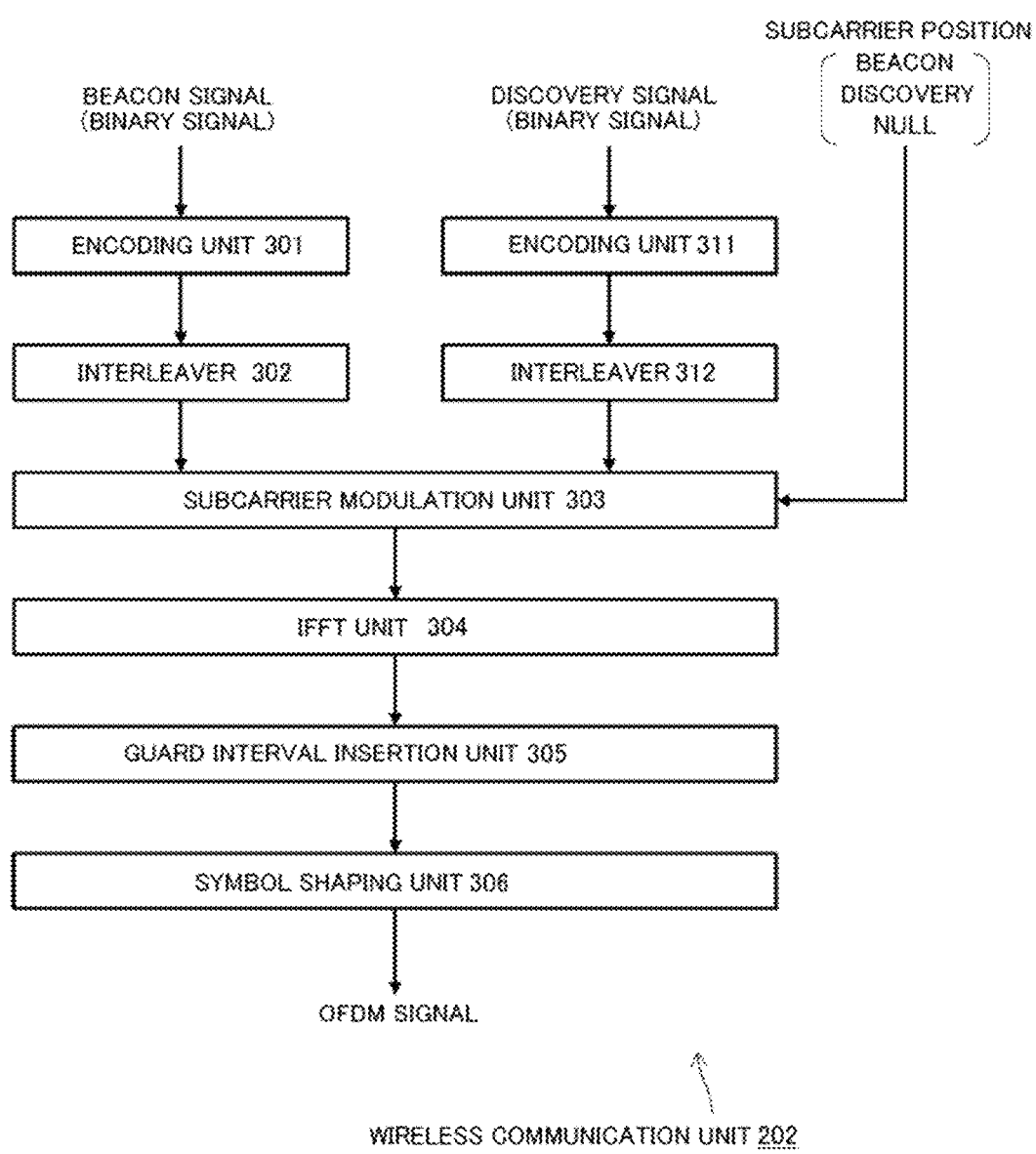
FIG. 3 is a diagram illustrating a functional configuration example in a wireless communication unit 202.

FIG. 3 schematically illustrates a functional configuration example in the wireless communication unit 202. Here, the drawing illustrates a configuration example mainly specialized for transmission of the beacon signal and the discovery signal.

In the wireless communication unit 202, when binary signals such as a beacon signal generated by the beacon signal generation unit 205 and the discovery signal generated by the discovery signal generation unit 207 are received from the signal processing unit 204, an encoding unit 301 and an interleaver 302 encode and interleave the beacon signal and an encoding unit 311 and an interleaver 312 encode and interleave the discovery signals. Thereafter, a subcarrier modulation unit 303 performs mapping for each subcarrier in accordance with subcarrier position information from the control unit 203. Further, an inverse fast Fourier transform (IFFT) unit 304 performs inverse Fourier transform, a guard interval (GI) insertion unit 305 inserts a guard interval, and a symbol shaping unit 306 performs shaping for each symbol to generate an OFDM signal. Thereafter, the OFDM signal is subjected to analog converting and up-converting to an RF band to be transmitted from the antenna 201.

In the wireless communication unit 202 that has the configuration illustrated in FIG. 3, one transmitter can generate the beacon signal and the discovery signal as one OFDM signal. Accordingly, in the wireless communication unit 202 that has the configuration illustrated in FIG. 3, the beacon signal and the discovery signal can be simultaneously transmitted at separate channels with a simple device configuration. The discovery signal is also mapped to a plurality of subcarriers in some cases.

Figure 4:
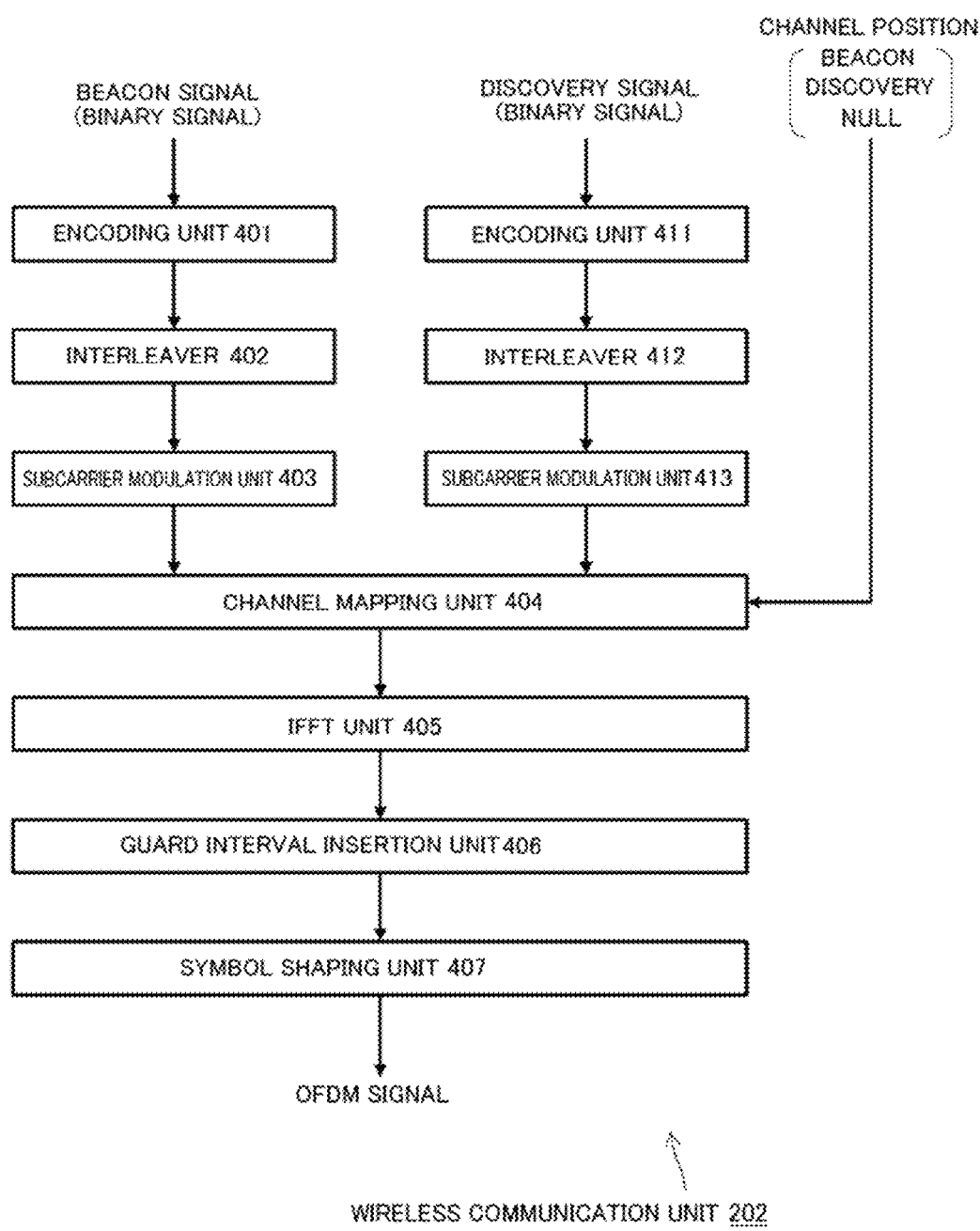
FIG. 4 is a diagram illustrating another functional configuration example in a wireless communication unit 202.

FIG. 4 schematically illustrates another functional configuration example in the wireless communication unit 202. Here, the drawing illustrates a configuration example mainly specialized for transmission of the beacon signal and the discovery signal.

In the wireless communication unit 202, an encoding unit 401 and an interleaver 402 encode and interleave the beacon signal, and further a subcarrier modulation unit 403 performs subcarrier modulation in units of channels. An encoding unit 411 and an interleaver 412 encode and interleave the discovery signal, and further a subcarrier modulation unit 413 performs subcarrier modulation in units of channels. Then, a channel mapping unit 404 allocates subcarriers of the beacon signal and the discovery signal to channels in accordance with channel position information from the control unit 203. Further, an IFFT unit 405 performs inverse Fourier transform, a guard interval (GI) insertion unit 406 inserts a guard interval, and a symbol shaping unit 407 performs shaping for each symbol to generate an OFDM signal. Thereafter, the OFDM signal is subjected to analog converting and up-converting to an RF band to be transmitted from the antenna 201.

In the wireless communication unit 202 that has the configuration illustrated in FIG. 4, after the beacon signal and the discovery signal are each subjected to subcarrier modulation in units of channels, the signals are allocated to the channels. As will be described below, the discovery signal may be transmitted using a plurality of channels. In this case, the channel mapping unit 404 copies the discovery signal and maps the discovery signal to a plurality of channels.

In the wireless communication unit 202 that has the configuration illustrated in FIG. 4, one transmitter can generate the beacon signal and the discovery signal as one OFDM signal. Accordingly, in the wireless communication unit 202 that has the configuration illustrated in FIG. 4, the beacon signal and the discovery signal can be simultaneously transmitted at separate channels with a simple device configuration (as described above).

Figure 5:
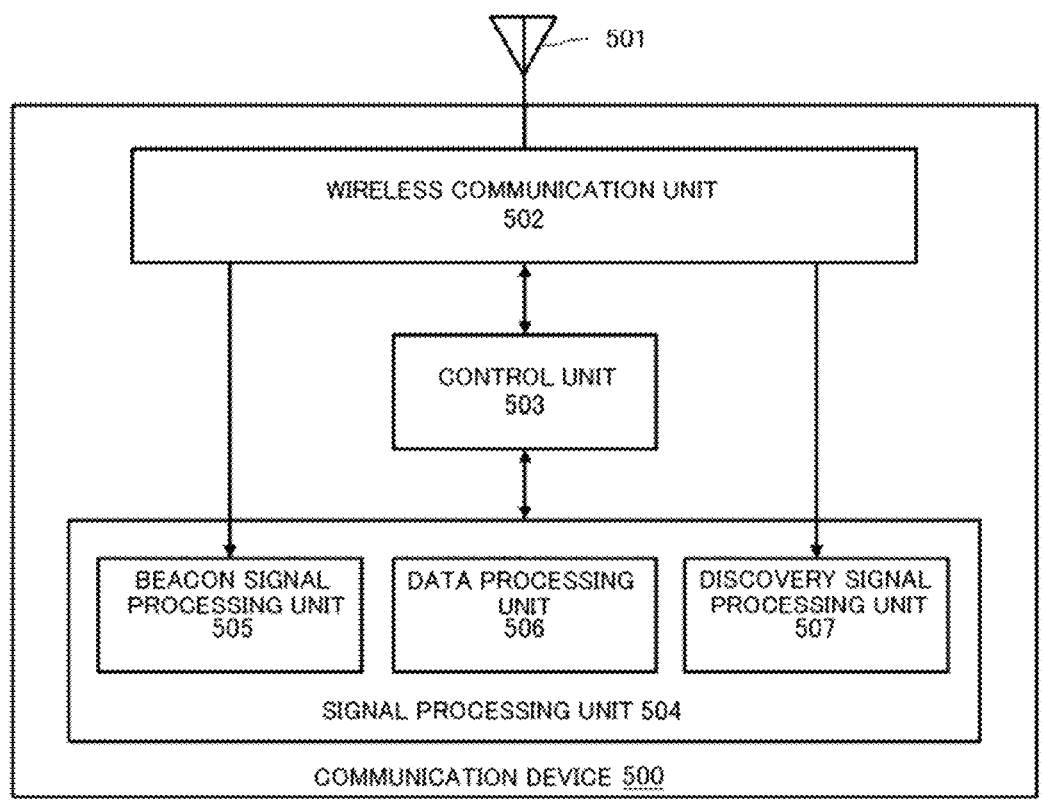
FIG. 5 is a diagram illustrating a functional configuration example of a communication device 500 operating as a communication terminal.

FIG. 5 schematically illustrates a functional configuration of a communication device 500 operating as a communication terminal. The illustrated communication device 500 includes an antenna 501, a wireless communication unit 502, a control unit 503, and a signal processing unit 504.

The control unit 503 generally controls the entire device such that the communication device 500 operates as a communication terminal. In the embodiment, the control unit 503 performs control such as searching of a nearby access point through a scanning operation for the beacon signal and the discovery signal, connection (association) to a wireless network (BSS) operated by the found access point, and the like.

During signal reception, the wireless communication unit 502 further performs processing such as modulating and decoding to reproduce information of an original bit sequence when an RF signal received by the antenna 501 is subjected to down-converting and digital converting to generate an OFDM signal. The wireless communication unit 502 has a role of exchanging the obtained information regarding the bit sequence with the signal processing unit 504.

In the embodiment, one wireless signal (one OFDM signal) in which the beacon signal and the discovery signal are allocated to different frequency channels arrives from the access point. The wireless communication unit 502 performs a scanning operation at one channel among the usable frequency channels and receives either the simultaneously arrived beacon signal or discovery signal in some cases.

The signal processing unit 504 processes the signal transmitted and received via the wireless communication unit 502. In the embodiment, the signal processing unit 504 includes a beacon signal processing unit 505 that processes the beacon signal received from the access point, a data processing unit 506 that processes a data signal for communication, and a discovery signal processing unit 507 that processes the discovery signal received from the access point.

The beacon signal includes information necessary for connection (association) to the wireless network (BSS) operated by the access point which is a transmission source (as described above). The beacon signal processing unit 505 notifies the control unit 503 of such a kind of information obtained by processing the beacon signal. The control unit 503 instructs each unit to perform a connection procedure to the access point, as necessary.

The discovery signal includes information used to specify a usage channel of the access point which is the transmission source (as described above). The discovery signal processing unit 507 notifies the control unit 503 of information regarding the usage channel specified by processing the discovery signal. The control unit 503 instructs each unit to perform a scanning operation at that usage channel as necessary.

Figure 6:
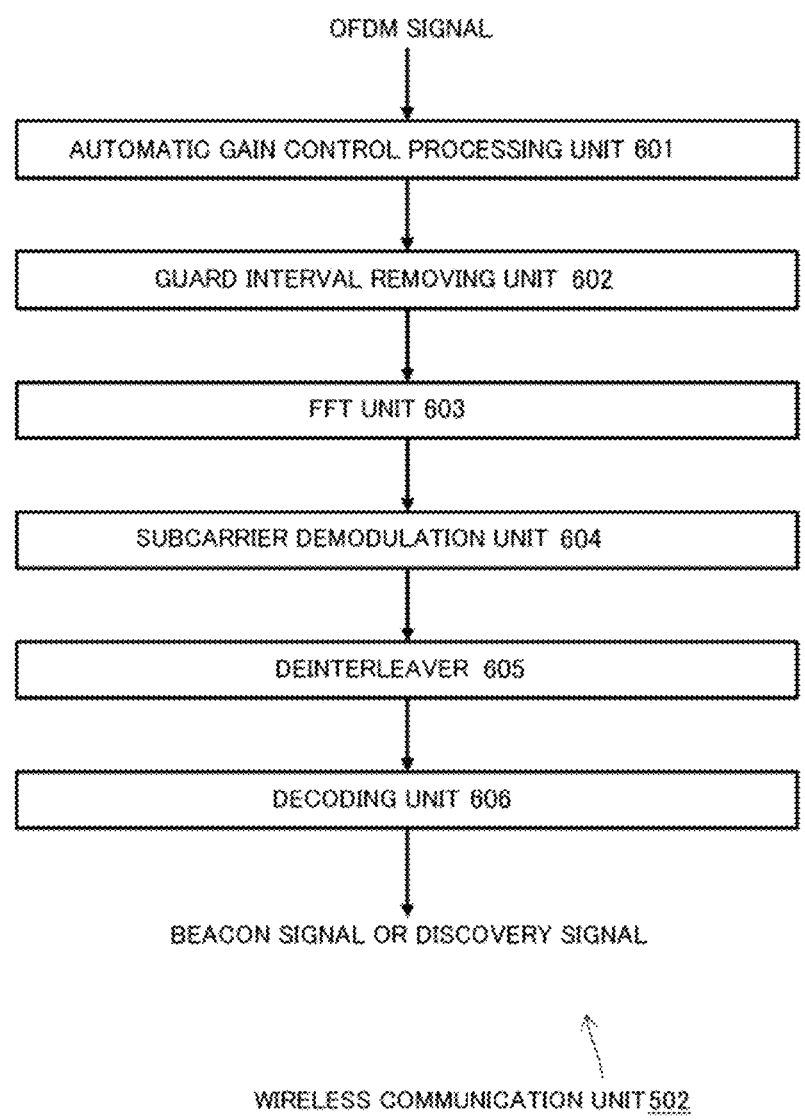
FIG. 6 is a diagram illustrating a functional configuration example in a wireless communication unit 502.

FIG. 6 schematically illustrates a functional configuration example in the wireless communication unit 502. The wireless communication unit 502 performs processing to transmit and receive wireless signals at the frequency channels instructed from the control unit 503. Here, FIG. 6 illustrates a configuration example mainly specialized for reception of the beacon signal and the discovery signal and after digital processing.

An automatic gain control processing unit 601 performs gain control of the received OFDM signal. A guard interval removing unit 602 removes a guard interval from an OFDM symbol. Further, an FFT unit 603 performs Fourier transform, a subcarrier demodulation unit 604 demodulates each subcarrier, and a deinterleaver 605 and a decoding unit 606 perform deinterleaving and decoding to decode the original beacon signal or discovery signal.

Figure 7:
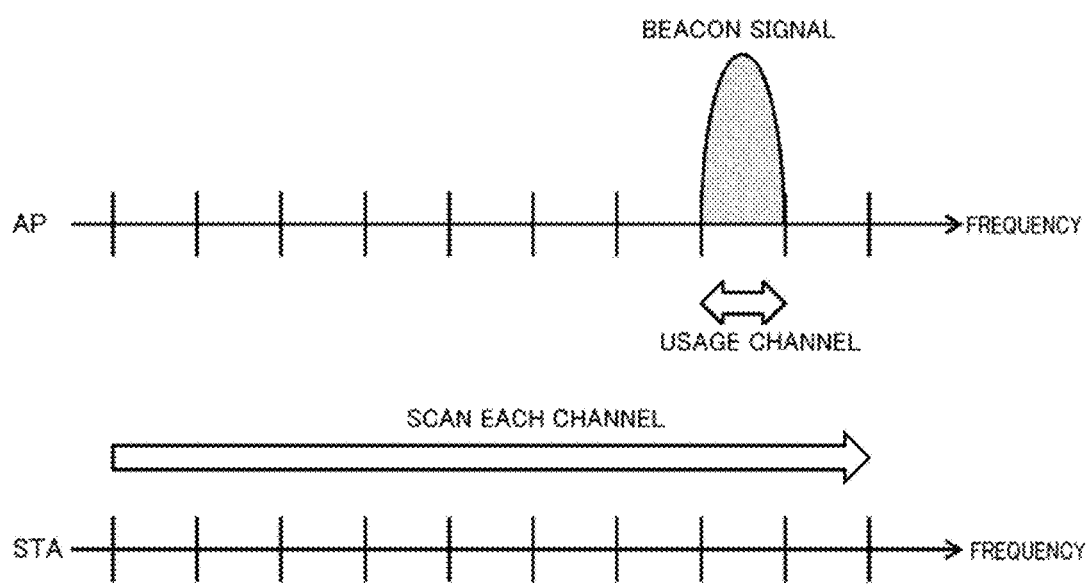
FIG. 7 is a diagram illustrating an example (a passive scan) of a scanning method.

FIG. 7 illustrates an example of a scanning method. Normally, an access point (AP) determines an operation channel called a usage channel and transmits a preamble signal subordinated in a beacon signal or data using the usage channel. On the other hand, the communication terminal (STA) performing passive scanning does not know where there is the usage channel set by the access point, and therefore scans each channel at a certain period. For example, when the number of candidate channels is 16 and a beacon interval of the access point is 100 milliseconds, the communication terminal requires a scanning time of a maximum of 16×100=1,600 milliseconds.

As described above, when expansion to the 6 GHz band of the wireless LAN is realized, the communication terminal has to perform scanning at more channels. Therefore, a method of shortening the scanning time of the communication terminal and discovering a usage channel of the access point immediately is preferable.

Figure 8:
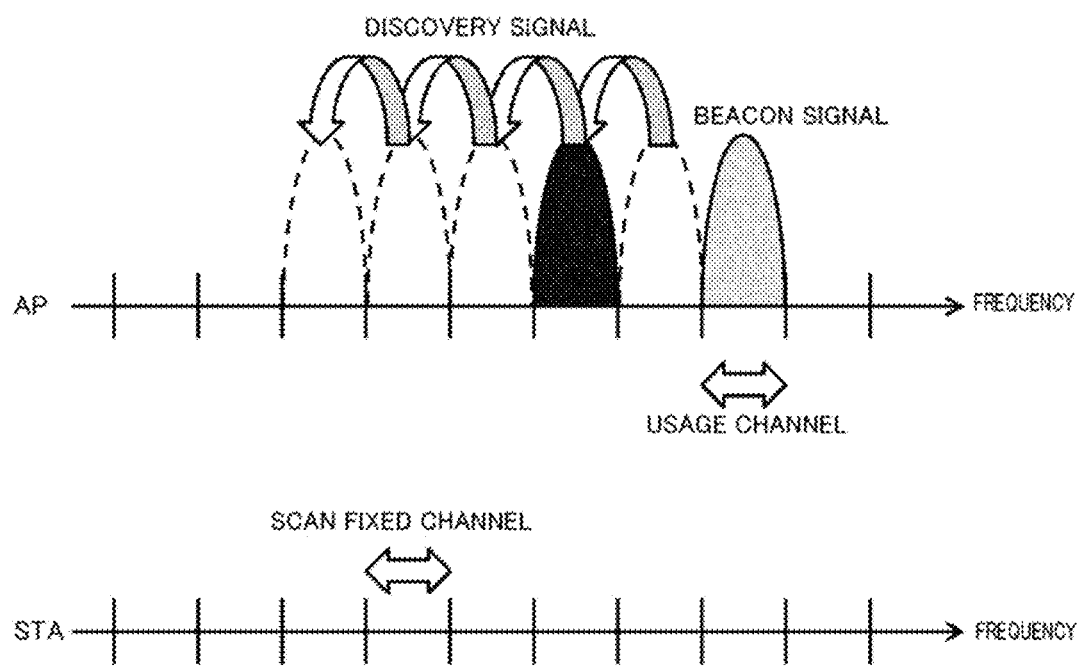
FIG. 8 is a diagram illustrating another example of the scanning method.

FIG. 8 illustrates another scanning method. In the drawing, the access point (AP) transmits the discovery signal different from the beacon signal at a period shorter than the beacon interval and periodically while performing frequency hopping. In the discovery signal, for example, information used to specify the usage channel of the access point is stored. Accordingly, the communication terminal (STA) can discover presence of the access point even in a state in which only a certain fixed channel (which may be a channel other than the usage channel) is scanned.

For example, when the access point transmits the discovery signal at intervals of 20 milliseconds, it is possible to shorten the scanning time of a maximum of 1,600 milliseconds up to a maximum of 320 milliseconds in the example illustrated in FIG. 7. When the communication terminal simultaneously switches the scanning channels, a probability of discovering the access point at a faster time increases.

From the viewpoint that the communication terminal can perform scanning more efficiently, a method in which the access point simultaneously transmits the discovery signals at a plurality of channels can be considered. On the communication device 200 operating as the access point, a wireless communication unit that transmits the discovery signal has to be mounted apart from the wireless communication unit 202 performing communication (transmission of the beacon signal and data communication) using the usage channel. The number of wireless communication units is necessary by the number of channels used to send simultaneously the discovery signals, which can be a considerable constraint on device mounting.

Accordingly, the present specification proposes the following method of shortening a scanning time without a decrease in efficiency of data communication by transmitting a beacon signal and a discovery signal as one wireless signal (an OFDM signal) using only one wireless communication unit 202 illustrated in FIG. 2.

Specifically, the communication device 200 operating as the access point can transmit the discovery signal at a plurality of channels with respect to one beacon signal by generating the OFDM signal in which the discovery signal is allocated to the plurality of channels other than the usage channel when there is transmission power to spare, and thus it is possible to realize further shortening the scanning time. On the other hand, when there is no transmission power to spare and the discovery signal cannot be allocated to the plurality of channels, it is possible to shorten the scanning time of the communication terminal without depending on device constraint by switching between the channels of the discovery signal in one OFDM signal.

Example 1

Figure 9:
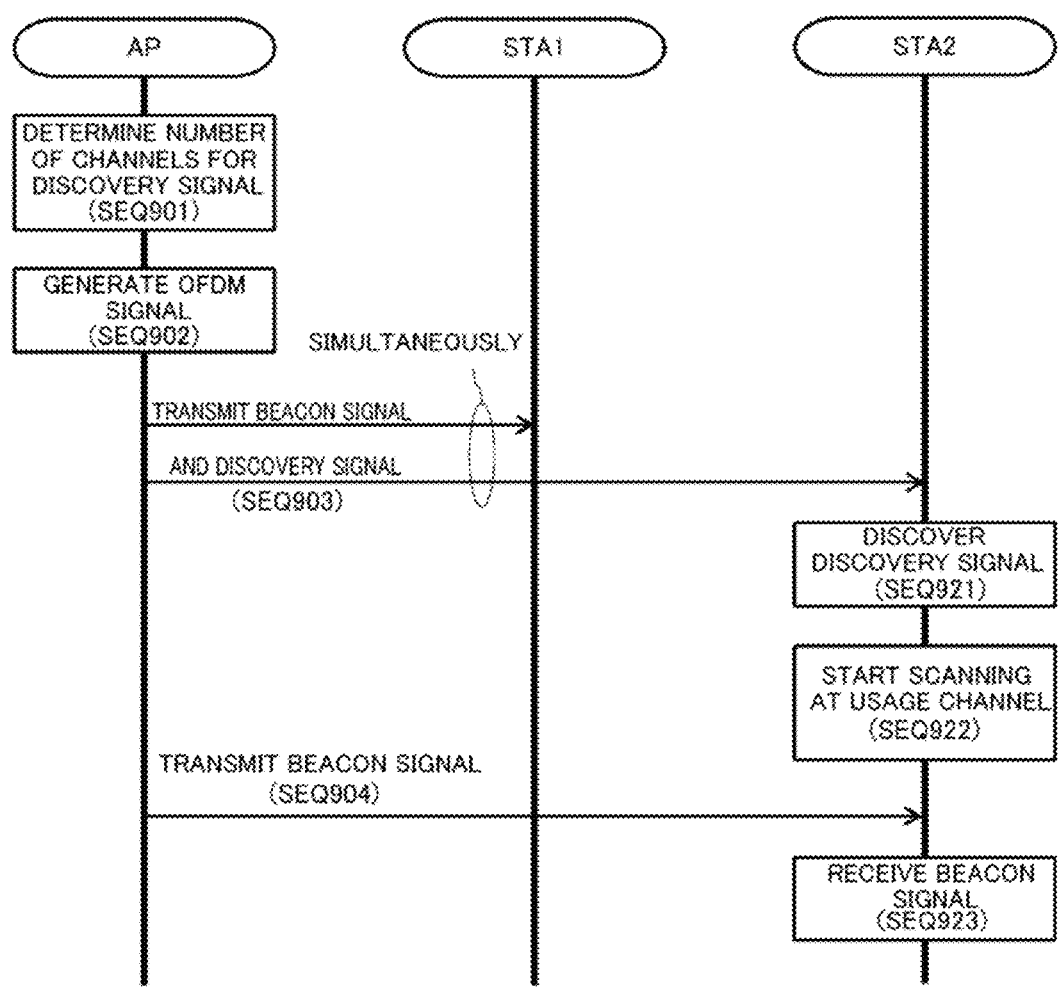
FIG. 9 is a diagram illustrating an example (Example 1) of a communication sequence performed in a communication system.

FIG. 9 illustrates an example of a communication sequence performed in a communication system. Here, in a communication system including one access point (AP) and two communication terminals (STA), it is assumed that STA1 is already in connection to BSS operated by AP, and STA2 is performing scanning without being connected to AP (see FIG. 1), the access point transmits the beacon signal and the discovery signal as one OFDM signal.

First, AP determines the number of channels to which the discovery signal is allocated based on own transmission power information (SEQ901). The details of a processing procedure for determining the number of channels to which the access point allocates the discovery signal will be described later.

Thereafter, AP generates the beacon signal and the discovery signal as one OFDM signal (SEQ902) and simultaneously transmits the beacon signal and the discovery signal (SEQ903). The details of a frame format of the discovery signal will be described later.

STA1 is already in connection with AP and can acquire only the beacon signal allocated to the usage channel to obtain necessary information.

On the other hand, when STA2 is performing scanning and can acquire the discovery signal at the channel which STA2 awaits (SEQ921), STA2 starts scanning at the usage channel of AP based on information included in the discovery signal (SEQ922) and awaits the beacon signal which will be subsequently transmitted from AP.

Subsequently, when the beacon signal is subsequently transmitted from AP (SEQ904), STA2 can receive the beacon signal (SEQ923). That is, when STA2 discovers the discovery signal which STA2 awaits at any channel, STA2 can await the beacon signal which will be subsequently transmitted at the usage channel of AP. Therefore, it is possible to shorten the scanning time.

STA2 can acquire information necessary for connection (association) to the wireless network (BSS) operated by AP from the beacon signal received from AP. Although not illustrated in FIG. 9, STA2 can transmit a probe request to AP using the usage channel as necessary and receive a probe response from AP.

Figure 10:
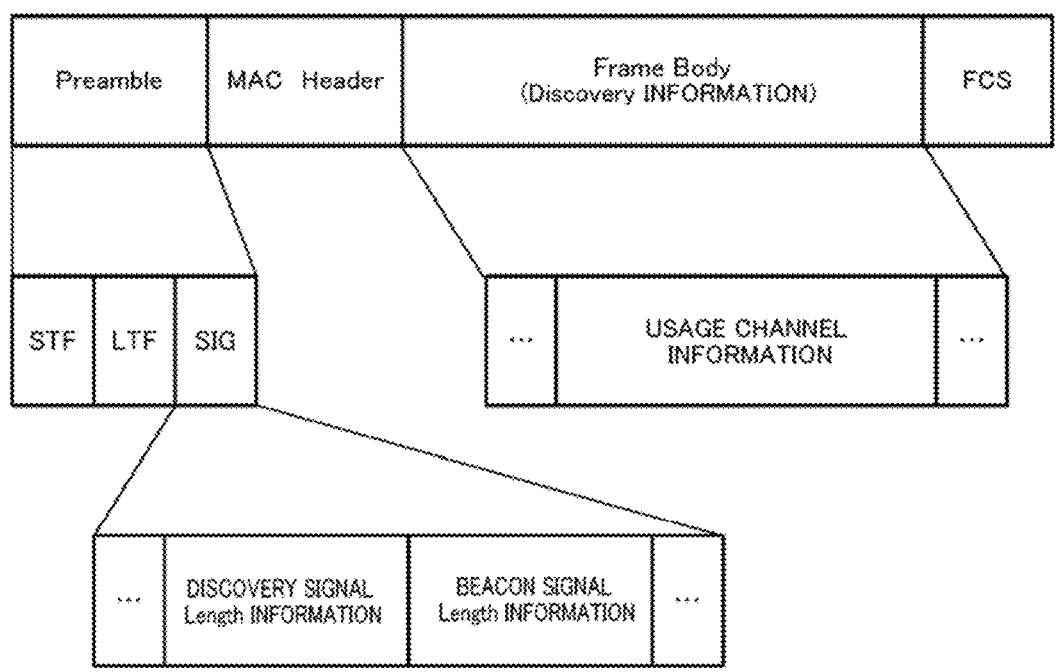
FIG. 10 is a diagram illustrating a frame format example of a discovery signal.

FIG. 10 illustrates an example of a frame format of the discovery signal. The drawing illustrates a frame that is set with reference to a frame format defined in IEEE 802.11 and includes a preamble, a media access control (MAC) header, and a frame body.

The preamble includes fields of a short training sequence (STF) used to acquire synchronization, a long training sequence (LTF) used to acquire accurate synchronization or estimate channels, and SIG in which information such as PHY layer parameters is stored.

In this example, the SIG field includes a field in which length information indicating a transmission length of the discovery signal or length information indicating a transmission length of the beacon signal is stored. Accordingly, the communication terminal can receive the discovery signal at the channel which the communication terminal awaits by acquiring the information regarding the transmission lengths of the discovery signal and the beacon signal, and subsequently can know until when the beacon signal is transmitted at the usage channel of the corresponding access point.

When any length information is information indicating until when each signal is transmitted, a description form is not particularly limited. For example, the length of the discovery signal or the beacon signal may be described in a time (second) unit or a bit unit.

The MAC header includes a MAC address of a transmission source or a transmission destination of the discovery signal and a duration length indicating a duration time of a frame. Here, since the MAC header has a structure conforming with the frame format defined in IEEE 802.11 basically, detailed description thereof will be omitted herein.

The frame body is a field in which data information which is desired to be communicated actually in the frame is stored. In this example, the frame body of the discovery signal includes usage channel information used to specify the usage channel (of the access point) to which at least the beacon signal is transmitted. Accordingly, the communication terminal receiving the discovery signal can appropriately switch the channel to the usage channel of a nearby access point.

The structure of other fields not stated in FIG. 10 is not particularly limited. For example, all the information including the beacon signal may be stored in the discovery signal.

An error detection code (frame check sequence: FCS) is added to the termination of the frame.

Figure 11:
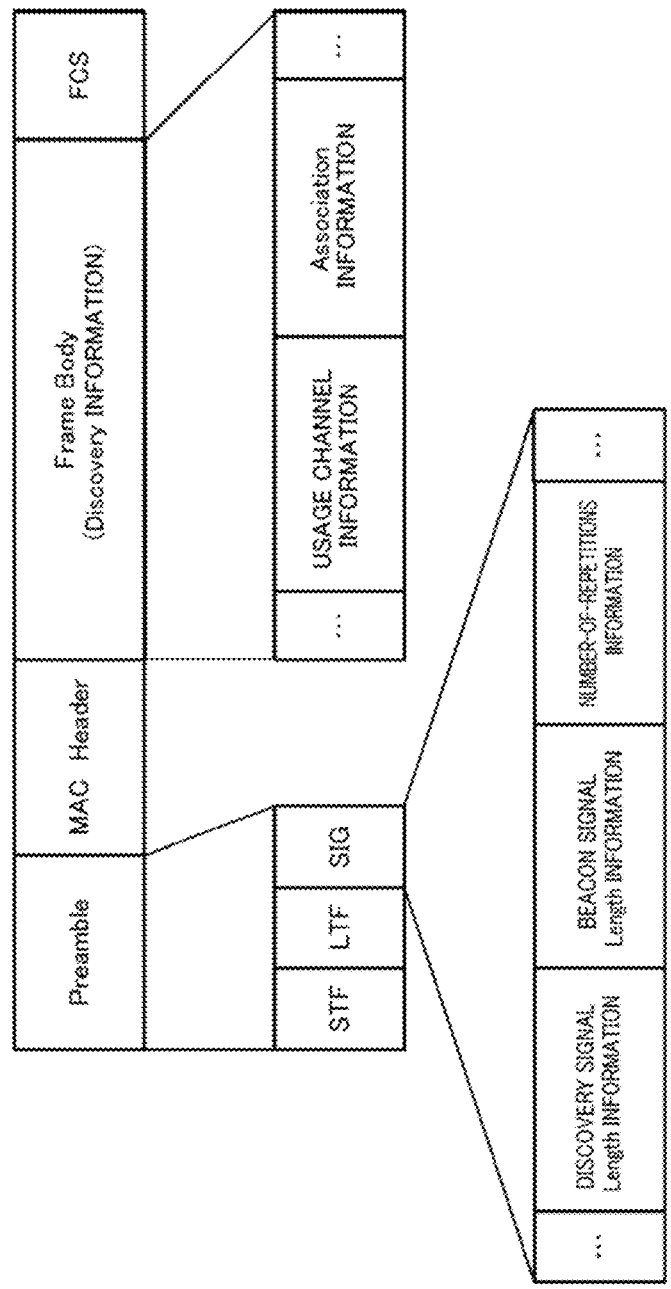
FIG. 11 is a diagram illustrating another frame format example of the discovery signal.

FIG. 11 illustrates another example of the frame format of the discovery signal. As one of differences from the discovery signal illustrated in FIG. 10, number-of-times information indicating the number of times the discovery signal is repeatedly transmitted is added to the SIG field. The details of a procedure in which the discovery signal is repeatedly transmitted will be described later.

The discovery signal illustrated in FIG. 11 further includes association information regarding connection to the access point of the transmission source (that is, association in the BSS operated by the access point) in the frame body. The association information is assumed to include, for example, capability information of the access point. Accordingly, the communication terminal receiving the discovery signal can specify the usage channel of the access point and can also be efficiently connected to the access point.

Figure 12:
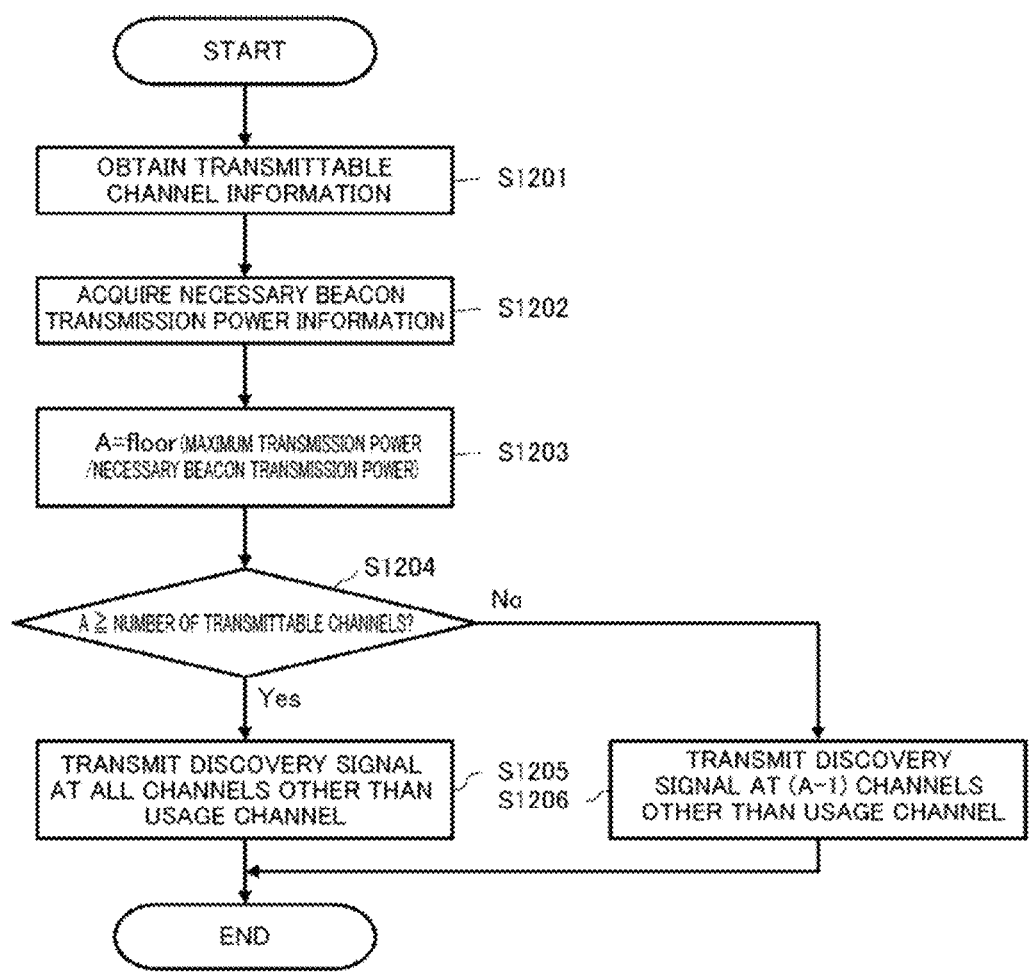
FIG. 12 is a flowchart illustrating a processing procedure when the number of channels to which an access point allocates discovery signals is determined.

FIG. 12 illustrates a processing procedure in the format of a flowchart when the number of channels to which the access point allocates the discovery signal is determined. The illustrated processing procedure is assumed to be performed by the control unit 203 as a main constituent in the communication device 200 operating as the access point.

The access point first determines the number of transmittable channels from the channel information determined to be transmittable when the own capability information and transmission right are acquired (step S1201).

Subsequently, the access point acquires information regarding a necessary beacon transmission power value (step S1202) and calculates a value "A" obtained by truncating a decimal point of a ratio to a maximum transmission power value which can be output by the access point (step S1203).

When the calculated value "A" is equal to or greater than the number of transmittable channels (Yes in step S1204), the access point transmits the discovery signal at all the channels other than the usage channel (step S1205) and the process ends.

Conversely, when the value "A" is less than the number of transmittable channels (No in step S1204), the access point transmits the discovery signal at (A−1) channels other than the usage channel (step S1206) and the process ends. In this case, a null signal is disposed at channels at which neither the beacon signal nor the discovery signal is disposed.

Hereinafter, several examples will be described.

For example, when the number of transmittable channels of the access point is 8, a necessary beacon transmission power value is 15 dBm/ch, and maximum transmission power is 23 dBm, "A" is floor (23 dBm/15 dBm)=9 and is equal to or greater than the number of transmittable channels of the access point. Accordingly, the access point can generate the OFDM signal in which the discovery signal is allocated to all 7 channels other than the usage channel. This is because even when the OFDM signal is generated at 8 channels with transmission power of 23 dBm, the transmission power value allocated to the beacon signal exceeds 15 dBm/ch which is necessary beacon transmission power.

On the other hand, when the number of transmittable channels of the access point is 8, necessary beacon transmission power is 20 dBm/ch, maximum transmission power is 23 dBm, "A" is floor (23 dBm/20 dBm)=2 and is less than the number of transmittable channels of the access point. Accordingly, the access point selects any one channel other than the usage channel and allocates the discovery signal to generate the OFDM signal in which a null signal is allocated to 6 channels other than the usage channel and the channel to which the discovery signal is allocated. This is because when the OFDM signal is generated at 8 channels with transmission power of 23 dBm, the transmission power value allocated to the beacon signal is less than 20 dBm/ch which is necessary beacon transmission power. In order for the transmission power value not to be less than the necessary beacon transmission power value, only one channel other than the usage channel has to be selected and allocated as the discovery signal.

A method of setting the above-described necessary beacon transmission power is not particularly limited. For example, by performing calculation from a positional relation with other access points or receiving a notification from an external database, own service area information of the access point may be acquired, and a transmission power value necessary to cover the own service area may be obtained. The necessary beacon transmission power may be directly notified of by an external database. As part of setting of configuration or the like of the communication device 200 by a user, the user may directly designate which percentage of the maximum transmission power value is allowed.

Figure 13:
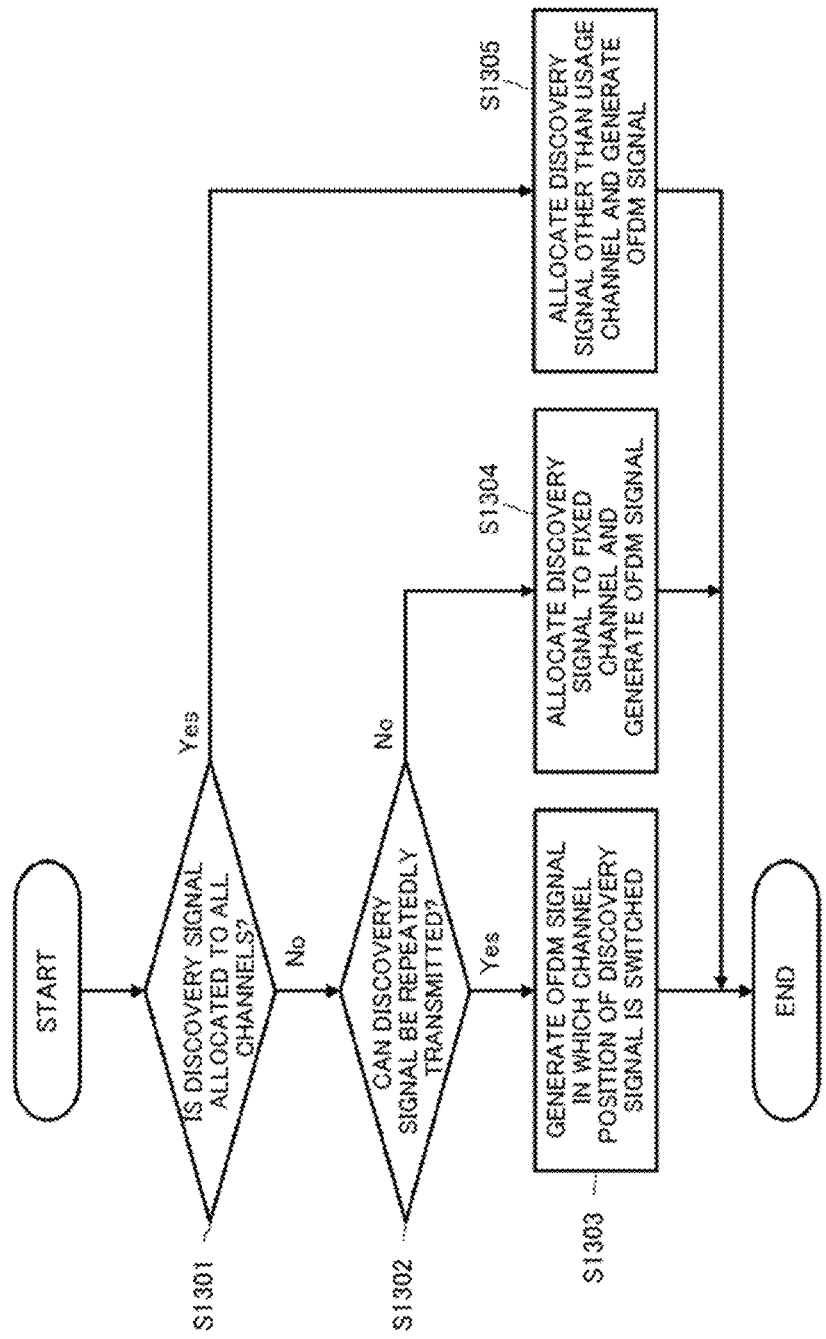
FIG. 13 is a flowchart illustrating a processing procedure when an access point generates an OFDM signal.

FIG. 13 illustrates a processing procedure in the format of a flowchart when the access point generates the OFDM signal in which the beacon signal and the discovery signal are disposed at different channels. The illustrated processing procedure is assumed to be performed by the control unit 203 as a main constituent in the communication device 200 operating as the access point. It is assumed that the processing procedure is performed by the access point after the number of channels at which the discovery signal is allocated in the processing procedure illustrated in FIG. 12 is determined.

When it is determined that the discovery signal is allocated to all the channels (Yes in step S1301), the access point allocates the beacon signal to the usage channel and generates the OFDM signal in which the discovery signal is allocated to all the other channels (step S1305), and then the process ends.

On the other hand, when it is determined that the discovery signal is allocated to some channels other than the usage channel (No in step S1301), the access point determines whether the discovery signal can be repeatedly transmitted during transmission of the beacon signal (step S1302). For example, even when a transmission time of the beacon signal is sufficiently long and the discovery signal is transmitted a plurality of times, it is determined whether transmission time of the beacon signal expires.

When it is determined that the discovery signal can be repeatedly transmitted (Yes in step S1302), the access point generates the OFDM signal in which a channel position of the discovery signal is switched in a time unit in one OFDM signal (step S1303) and the process ends.

Conversely, when it is determined that the discovery signal cannot be repeatedly transmitted (No in step S1302), the access point generates the OFDM signal in which the discovery signal is allocated to a fixed channel selected from the channels other than the usage channel (step S1304) and the process ends.

Figure 14:
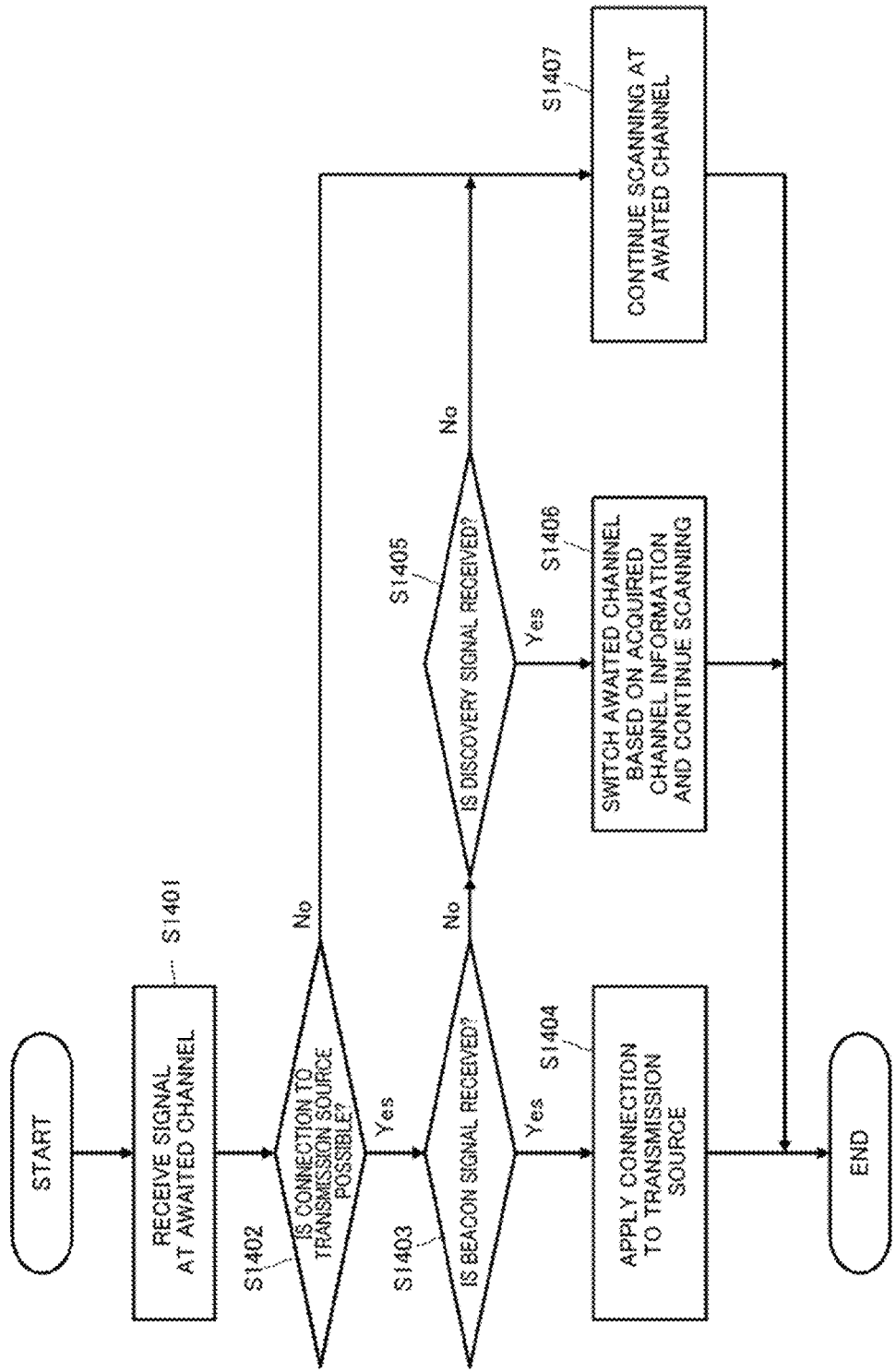
FIG. 14 is a flowchart illustrating a processing procedure when a communication terminal receives an OFDM signal.

FIG. 14 illustrates a processing procedure in the format of a flowchart when the communication terminal receives the OFDM signal. The illustrated processing procedure is assumed to be performed by the control unit 503 as a main constituent in the communication device 500 operating as the communication terminal. The communication terminal receives the OFDM signal in which the access point disposes the beacon signal and the discovery signal at different channels in the processing procedure illustrated in FIG. 13 in some cases.

When the communication terminal receives a signal at the awaited channel (step S1401), the communication terminal checks whether connection to a transmission source of the signal is possible (step S1402). Specifically, based on the received signal, it is checked whether the transmission source of the signal is the access point or whether a service set identifier (SSID) desired to be connected by the communication terminal is matched when the transmission source is the access point.

Then, when the communication terminal determines that connection to the transmission source is possible (Yes in step S1402), it is continuously checked whether the signal received in step S1401 is the beacon signal (step S1403).

When the beacon signal is received (Yes in step S1403), the channel awaited by the communication terminal is the usage channel of the access point of the transmission source. Accordingly, the communication terminal acquires information necessary for connection (association) from the received beacon signal and applies connection to the access point using the usage channel (step S1404), and then the process ends.

When the signal received in step S1401 is not the beacon signal (No in step S1403), the communication terminal further checks whether the signal received in step S1401 is the discovery signal (step S1405).

When the discovery signal is received (Yes in step S1405), the communication terminal specifies the usage channel of the access point of the transmission source based on the information described in the discovery signal, switches the awaited channel to the usage channel, and continues the scanning operation (step S1406). Thus, the communication terminal can await the signal at the channel at which the access point of the transmission source is expected to transmit the beacon signal.

When the received discovery signal includes sufficient association information (the capability information or the like of the access point) necessary for connection to the access point along with the information regarding the usage channel of the access point, the channel can be switched to the usage channel of the access point in step S1406, the scanning operation can be omitted, and the connection to the access point can be applied suddenly.

Conversely, when it is determined that the connection to the transmission source is not possible (No in step S1402) or neither the beacon signal nor the discovery signal is received (No in step S1405), the communication terminal continues the scanning operation at the currently awaited channel (step S1407).

Next, advantageous effects realized in this example will be described.

Figure 15:
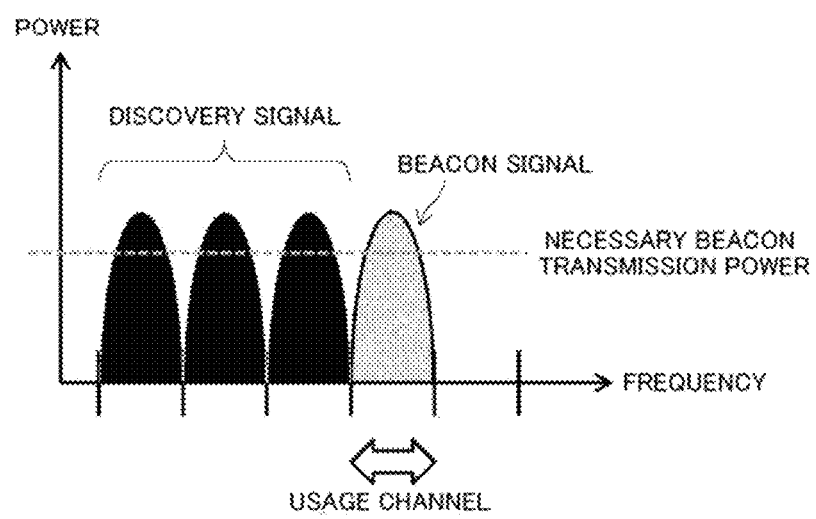
FIG. 15 is a diagram illustrating an allocation example (a relation between a frequency and power) of a beacon signal and a discovery signal.
Figure 16:
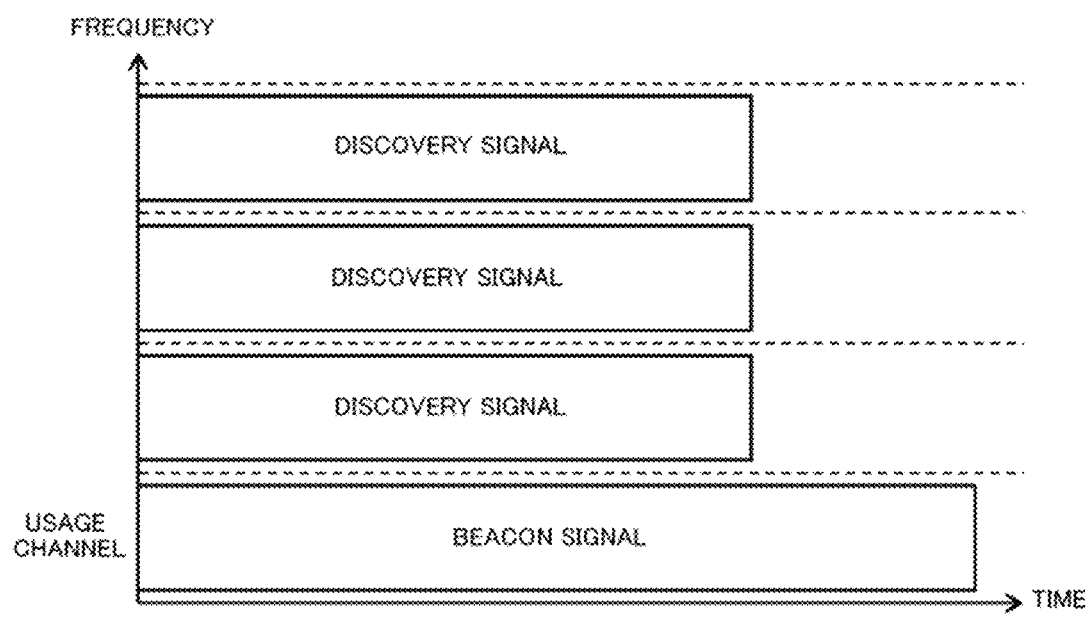
FIG. 16 is a diagram illustrating a relation between a time and a frequency in the allocation example of the signals illustrated in FIG. 15.

FIG. 15 illustrates an allocation example of the beacon signal and the discovery signal (a relation between frequency and power) when the number of transmittable channels of the access point is 4 and A=4 is calculated in the processing procedure illustrated in FIG. 12. FIG. 16 illustrates a relation between time and frequency in the signal allocation example illustrated in FIG. 15.

In the example illustrated in FIG. 15, the access point allocates the beacon signal to the usage channel and allocates the discovery signal to 3 transmittable channels other than the usage channel. Even when the signal allocation is performed, transmission power of each channel exceeds necessary beacon transmission power. The access point can transmit the discovery signal using a plurality of channels at once.

Accordingly, in the examples illustrated in FIGS. 15 and 16, the discovery signal is transmitted at any channel other than the usage channel. Therefore, the communication terminal (for example, STA2 in FIG. 1) which is performing the scanning can considerably shorten a time until the discovery signal is acquired.

Figure 17:
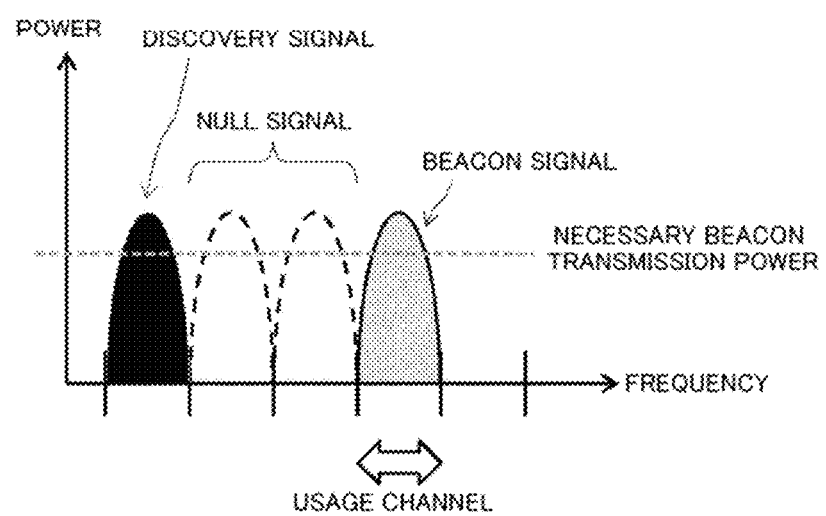
FIG. 17 is a diagram illustrating an allocation example (a relation between a frequency and power) of a beacon signal and a discovery signal.
Figure 18:
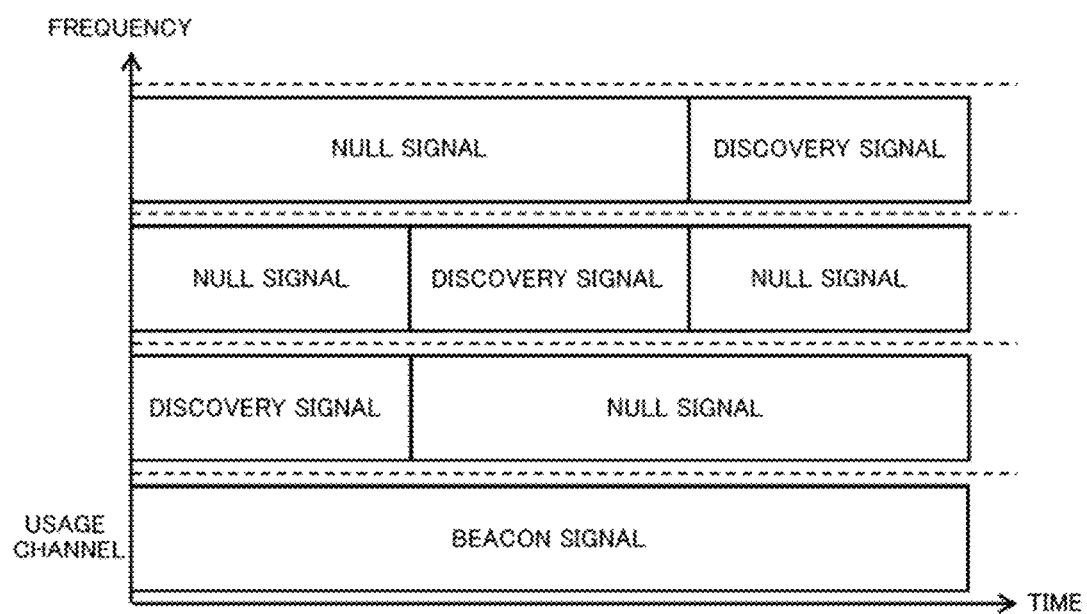
FIG. 18 is a diagram illustrating a relation between a time and a frequency in the allocation example of the signals illustrated in FIG. 17.

FIG. 17 illustrates an allocation example of the beacon signal and the discovery signal (a relation between frequency and power) when the number of transmittable channels of the access point is 4 and A=2 is calculated in the processing procedure illustrated in FIG. 12. FIG. 18 illustrates a relation between time and frequency in the signal allocation example illustrated in FIG. 17.

In the example illustrated in FIG. 17, the access point allocates the beacon signal to the usage channel, selects only one channel among other 3 transmittable channels and allocates the discovery signal, and generates the OFDM signal in which the transmission power of each channel can satisfy necessary beacon transmission power. In accordance with the process of generating the OFDM signal, as illustrated in FIG. 13, it is determined that the discovery signal can be transmitted repeatedly during the transmission of the beacon signal, and the OFDM signal in which the channel position of the discovery signal is switched in a time unit in one OFDM signal is generated, as illustrated in FIG. 18. A null signal is allocated to two channels other than the usage channel and the channel to which the discovery signal is allocated.

Accordingly, in the examples illustrated in FIGS. 17 and 18, the discovery signal is transmitted at any channel other than the usage channel. Therefore, the communication terminal (for example, STA2 in FIG. 1) which is performing the scanning can considerably shorten a time until the discovery signal is acquired.

Example 2

Figure 19:
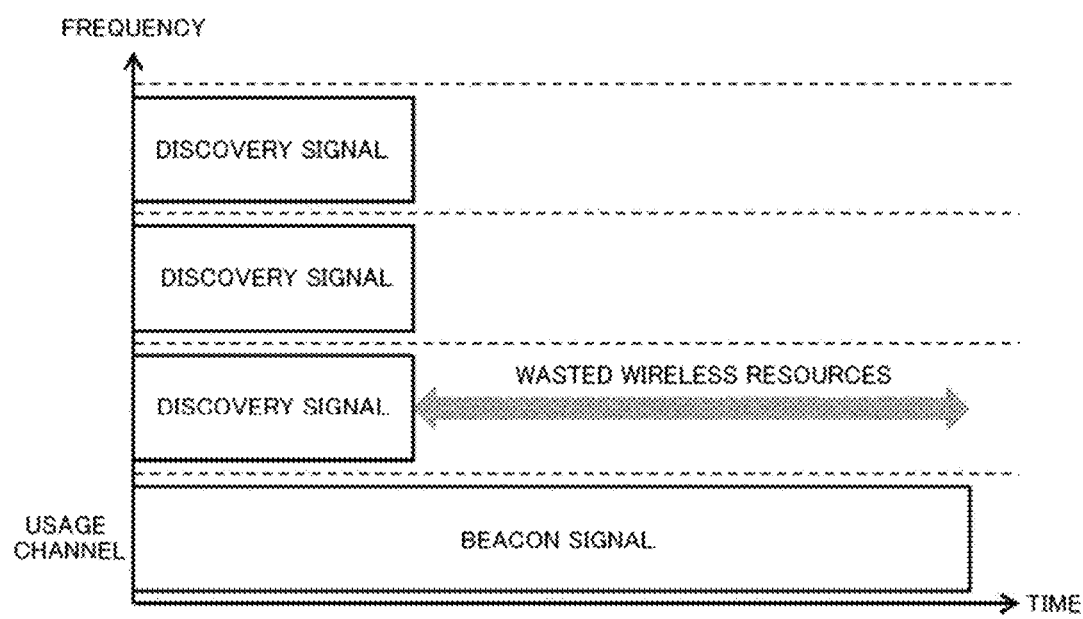
FIG. 19 is a diagram illustrating an allocation example (a relation between a frequency and power) of a beacon signal and a discovery signal.

FIG. 19 illustrates an allocation example of the beacon signal and the discovery signal (a relation between frequency and power). As described above, the access point can allocate the beacon signal to the usage channel and allocate the discovery signal to a plurality of channels. In the example illustrated in FIG. 19, a transmission time of the discovery signal is shorter than a transmission time of the beacon signal. Therefore, wireless resources other than the usage channel may be wasted until transmission of the discovery signal is finished and then transmission of the beacon signal is finished.

It can also be considered that a considerable amount of information is set in the discovery signal and a transmission time is lengthened to efficiently utilize the resources. In contrast, in this example, a method of shortening a transmission time necessary to transmit the beacon signal by broadly banding the beacon signal from the middle using the channels other than the usage channel after the transmission of the discovery signal ends is proposed.

Hereinafter, the beacon signal which is broadly banded from the middle and transmitted is referred to as a division beacon signal, the beacon signal transmitted using only the usage channel before the broad-banding is referred to as division beacon signal 1, and the beacon signal broadly banded also using the channel other than the usage channel is referred to as division beacon signal 2.

Figure 20:
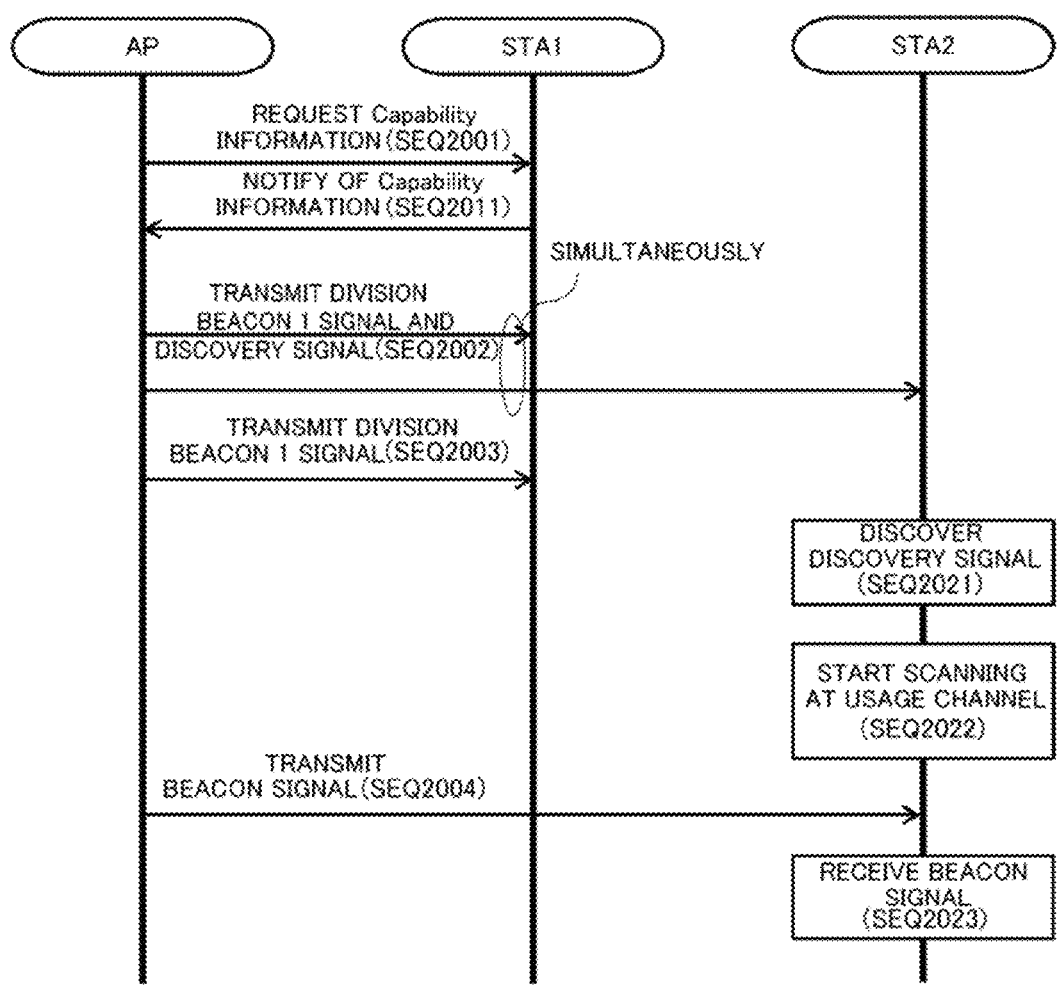
FIG. 20 is a diagram illustrating an example (Example 2) of a communication sequence performed in a communication system.

FIG. 20 illustrates an example of a communication sequence performed in the communication system according to this example. Here, in the communication system including one access point (AP) and two communication terminals (STA), it is assumed that STA1 is already in connection to the BSS operated by AP, and STA2 is performing scanning without being connected to AP (see FIG. 1), the access point appropriately transmits the division beacon signal.

First, AP performs exchanging capability information with STA1 which is in the connection. Specifically, AP requests the capability information from STA1 (SEQ2001) and STA1 notifies AP of the own capability information (SEQ2011). Then, AP determines whether STA1 can receive the division beacon signal based on the capability information notified of by STA1 or determines whether the division beacon signal may be transmitted and a band in which the division beacon signal is transmitted when the band information of the acquirable division beacon signal is acquired.

In the example of the communication sequence illustrated in FIG. 20, it is assumed that all STAs in connection to AP can acquire the division beacon signal, and thus AP transmits the division beacon signal. Specifically, AP transmits the discovery signal and division beacon signal 1 as one OFDM signal (SEQ2002) and transmits division beacon signal 2 after the transmission of the discovery signal ends (SEQ2003).

STA1 is already in connection with AP and can acquire only the beacon signal allocated to the usage channel to obtain necessary information.

On the other hand, when STA2 is performing scanning and can acquire the discovery signal at the channel which STA2 awaits (SEQ2021), STA2 starts scanning at the usage channel of AP based on information included in the discovery signal (SEQ2022).

Subsequently, when the beacon signal is subsequently transmitted from AP (SEQ2004), STA2 waits at the usage channel of AP and therefore can receive the beacon signal (SEQ2023).

That is, when STA2 discovers the discovery signal awaited at any channel, STA2 can await the beacon signal transmitted subsequently at the usage channel of AP. Therefore, it is possible to shorten the scanning time. It is possible to obtain the advantage that STA1 can also acquire much information regarding AP from the division beacon signal broadly banded from the middle.

Figure 21:
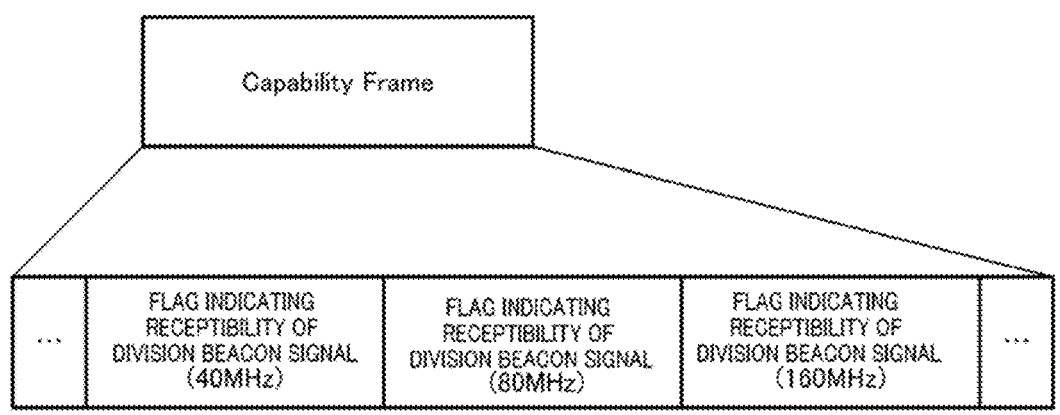
FIG. 21 is a diagram illustrating a configuration example of a capability information frame.

FIG. 21 illustrates a configuration example of a capability information frame used when the communication terminal notifies the access point of a connection destination of the capability information. The illustrated frame includes a flag indicating whether the communication terminal can perform reception at each bandwidth of broadly banded division beacon signal 2. The communication terminal sets a flag corresponding to the receivable band and notifies the access point that the reception is possible at the bandwidth (that is, division beacon signal 2 can be broadly banded up to the bandwidth).

In FIG. 21, bandwidths indicating whether the reception is possible are 40 MHz, 80 MHz, and 160 MHz, but the capability information may be exchanged at each bandwidth at which division beacon signal 2 can be transmitted.

When there is a communication terminal which cannot transmit the capability information frame illustrated in FIG. 21 (a legacy terminal that operates in conformity with a standard of the related art) in the communication system, the access point treats all the flags as "false" and guarantees compatibility of the legacy terminal so that the beacon signal is not broadly banded at any bandwidth.

Figure 22:
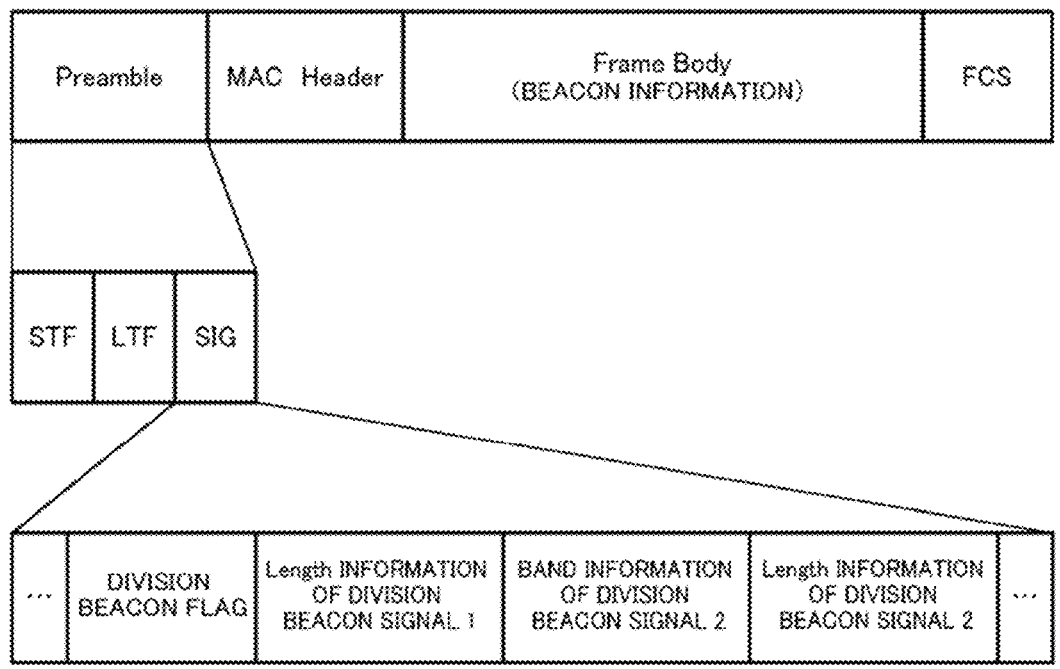
FIG. 22 is a diagram illustrating a frame format example of division beacon signal 1.

FIG. 22 illustrates an example of a frame format of division beacon signal 1. The drawing illustrates a frame that is set with reference to a frame format defined in IEEE 802.11 and includes a preamble, a MAC header, and a frame body, and an error detection code FCS is added to the termination of the frame.

The preamble includes fields of a short training sequence STF used to acquire synchronization, a long training sequence LTF used to acquire accurate synchronization or estimate channels, and SIG in which information such as PHY layer parameters is stored.

The SIG field of division beacon signal 1 includes a division signal flag indicating that the beacon signal is the division beacon signal, a length information field indicating a transmission length of division beacon signal 1, a band information field indicating a band used in broadly banded division beacon signal 2, and a length information field indicating a transmission length of division beacon signal 2.

When division beacon signal 1 with the frame format illustrated in FIG. 22 is received, the communication terminal can determine whether the bacon signal is broadly banded subsequently based on the division signal flag and specify a timing at which division beacon signal 2 is broadly banded based on division beacon signal 1_length information. Thereafter, the communication terminal can await division beacon signal 2 in a band indicated by division beacon signal 2_band information at broad-banding timing. The division beacon 2_length information may be length information of an entire division beacon signal in which division beacon signal 1 and division beacon signal 2 are combined.

The MAC header basically has a structure conforming with the frame format defined in IEEE 802.11 basically. Therefore, detailed description will be omitted herein. Beacon information is stored in the frame body, but detailed description thereof will be omitted herein.

Figure 23:
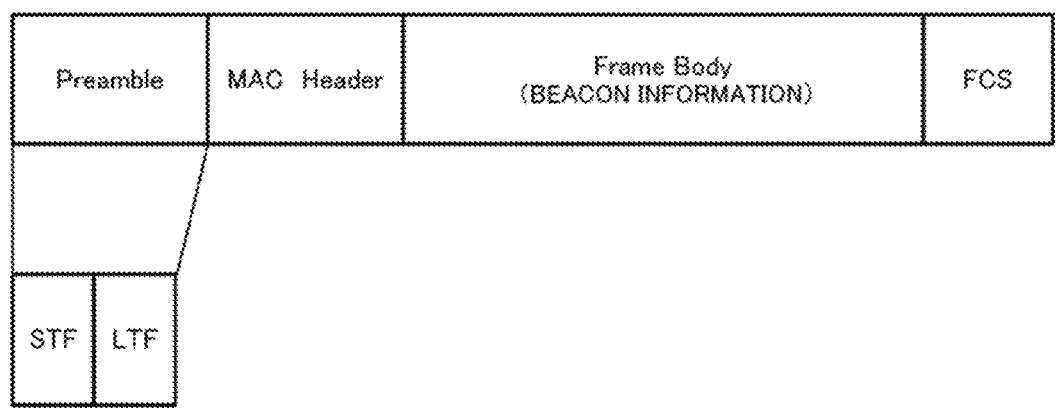
FIG. 23 is a diagram illustrating a frame format example of division beacon signal 2.

FIG. 23 illustrates an example of a frame format of division beacon signal 2. The drawing illustrates a frame that is set with reference to a frame format defined in IEEE 802.11 and includes a preamble, a MAC header, and a frame body, and an error detection code FCS is added to the termination of the frame.

The preamble includes fields of a short training sequence STF used to acquire synchronization and a long training sequence LTF used to acquire accurate synchronization or estimate channels. The STF and the LTF are transmitted in the broad-banded band. Unlike division beacon signal 1, the preamble of division beacon signal 2 does not have the SIG field.

The MAC header of division beacon signal 2 has a structure conforming with the frame format defined in IEEE 802.11 basically. Therefore, detailed description will be omitted herein. Beacon information is stored in the frame body, but detailed description thereof will be omitted herein.

Figure 24:
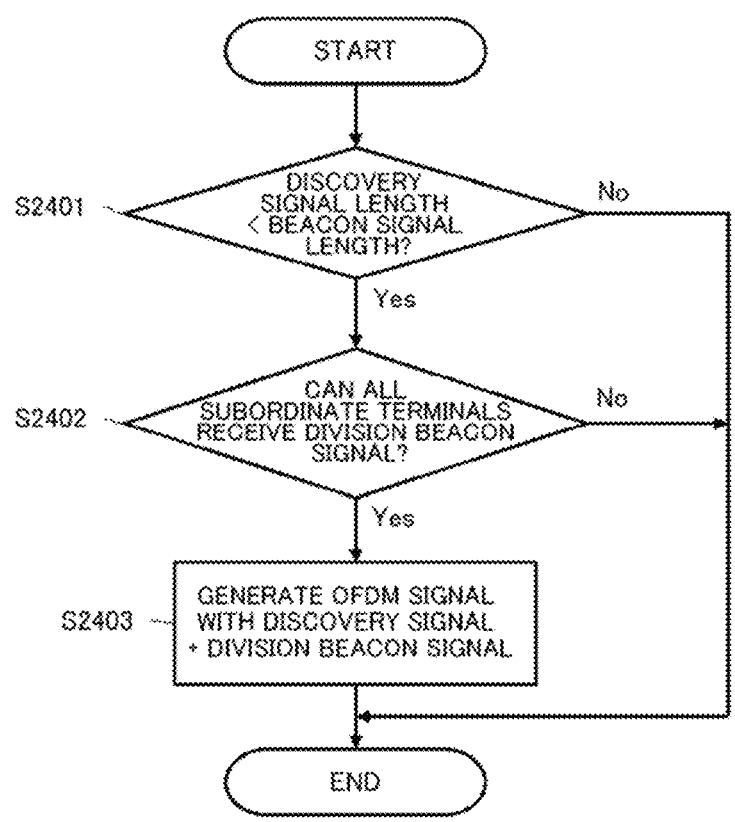
FIG. 24 is a flowchart illustrating a processing procedure in which the access point transmits a division beacon signal.

FIG. 24 illustrates a processing procedure in which the access point performs transmitting the division beacon signal in the format of a flowchart in this example.

The access point first compares the transmission lengths of the discovery signal and the beacon signal with each other (step S2401).

Here, when the beacon signal is not longer than the discovery signal (or is not longer by a predetermined length) (No in step S2401), it is not necessary to transmit the division beacon signal. Therefore, the subsequent processing steps are all skipped and the process ends. In this case, the access point transmits the beacon signal and the discovery signal by allocating the signals, for example, as illustrated in FIG. 16 or 18.

Conversely, when the beacon signal is longer than the discovery signal (or longer by a predetermined length) (Yes in step S2401), the access point checks the capability information of subordinate communication terminals and continuously determines whether the division beacon signal can be received (step S2402).

When any one of the subordinate communication terminals cannot receive the division beacon signal (No in step S2402), the access point stops transmitting the division beacon signal and skips all the subsequent processing steps, and the process ends. In this case, the access point accepts waste of wireless resources and transmits the beacon signal and the discovery signal by allocating the signals, for example, as illustrated in FIG. 19.

Conversely, when all the subordinate communication terminals can receive the division beacon signal (Yes in step S2402), the access point generates the OFDM signal in which the division beacon signal and the discovery signal are allocated (step S2403) and performs transmitting the OFDM signal.

Figure 25:
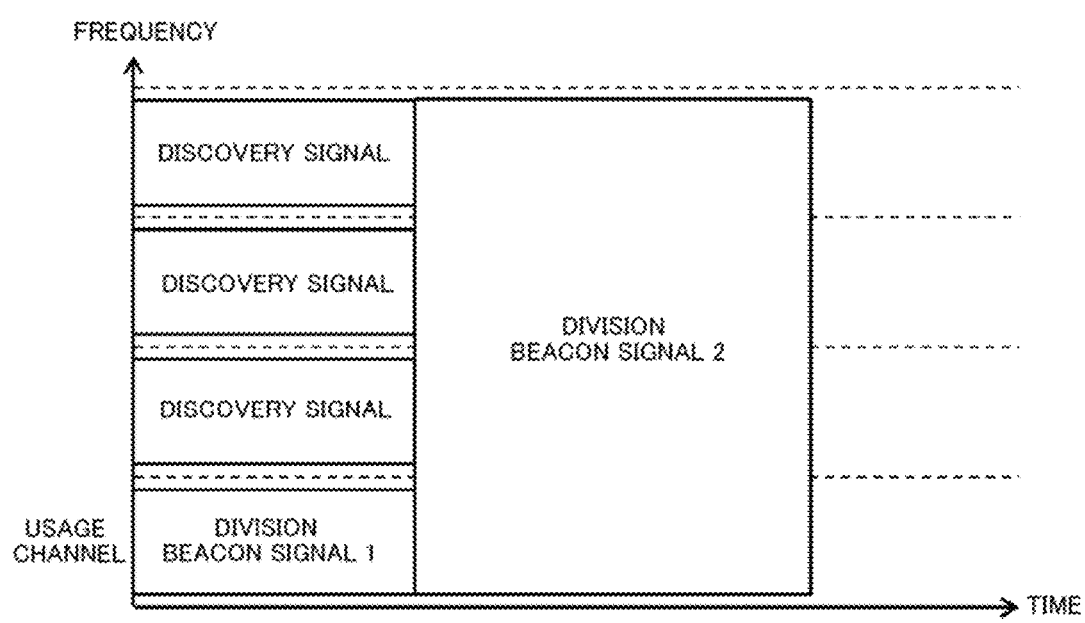
FIG. 25 is a diagram illustrating an allocation example (a relation between a frequency and power) of a beacon signal and a discovery signal.

FIG. 25 illustrates a relation between time and frequency in an allocation example of the beacon signal and the discovery signal in this example. In processing step S2403 of the flowchart illustrated in FIG. 24, the OFDM signal in which the division beacon signals and the discovery signal are allocated in accordance with the signal division, as illustrated in FIG. 25, is transmitted.

The access point can allocate division beacon signal 1 to the usage channel and allocate the discovery signal to a plurality of channels. Thereafter, the transmission time of the discovery signal is shorter than the transmission time of the beacon signal. Therefore, when transmission of the discovery signal is finished and then transmission of the beacon signal is finished, the access point starts transmitting division beacon signal 2 broadly banded using the channels other than the usage channel. In step S2403 of the flowchart illustrated in FIG. 24, signal allocation illustrated in FIG. 25 is performed in one OFDM signal.

In this way, the access point broadly bands the beacon signal from the middle after the transmission of the discovery signal ends using the division beacon signal. Then, it is possible to shorten the transmission time necessary to transmit the beacon signal while guaranteeing the shortening of the scanning time of the communication terminal.

There may be a slight interval between division beacon signal 1 and the discovery signal, and division beacon signal 2.

Finally, the advantageous effects obtained in accordance with the method of shortening the scanning time will be mentioned as proposed in the present specification.

In accordance with the method of shortening the scanning time, as proposed in the present specification, the access point can efficiently transmit the scanning signal. Further, the access point can be realized with a simpler device configuration.

Specifically, in the communication device operating as the access point, one transmitter can transmit the discovery signal and the beacon signal as one OFDM signal.

The communication device operating as the access point allocates the plurality of discovery signals to the channels other than the usage channel and transmits the discovery signal when there is transmission power to spare (see FIG. 16), and thus it is possible to realize further shortening the scanning time of the communication terminal.

Even when the number of channels at which the discovery signal can be disposed is small because of the transmission power information, the channels of the discovery signal in the OFDM signal can be switched (see FIG. 18), and thus it is possible to shorten the scanning time of the communication terminal.

The access point broadly bands the beacon signal and transmits the beacon signal using the band after the transmission of the short discovery signal ends (see FIG. 25), and thus it is possible to transmit the beacon signal efficiently without wasted wireless resources.

INDUSTRIAL APPLICABILITY

The technology disclosed in the present specification has been described with reference to the specific embodiment. However, it is apparent that those skilled in the art can correct or substitute the embodiment within the scope of the technology without departing from the gist of the technology disclosed in the present specification.

The technology disclosed in the present specification can be applied to a wireless LAN conforming with, for example, the IEEE 802.11 standard, and can also be applied to various types of wireless networks in which multi-channels are used, and thus it is possible to similarly realize searching of a searching time of the access point and stabilization of data transmission by collision avoidance.

In short, the technology disclosed in the present specification has been described giving the examples. Therefore, the described content of the present specification should not be construed to be limited. To determine the gist of the technology disclosed in the present specification, the claims have to be considered.

The technology disclosed in the present specification can also take the following configurations.

(1) A communication device including:
   a first signal processing unit configured to generate a first signal;
   a second signal processing unit configured to generate a second signal including information regarding the first signal; and
   a communication unit configured to simultaneously transmit the first and second signals.

(2) The communication device according to (1), wherein the communication unit generates the first and second signals as one wireless signal.

(3) The communication device according to (1) or (2), wherein
   the communication device functions as an access point in a wireless network, the first signal processing unit generates the first signal of which a subordinate communication terminal is notified, and the second signal processing unit generates the second signal of which a communication terminal before connection is notified.

(4) The communication device according to (3), wherein
   the first signal processing unit generates a beacon signal as the first signal, and the second signal processing unit generates a discovery signal including information regarding transmission of the beacon signal as the second signal.

(5) The communication device according to any one of (1) to (4), wherein
   the second signal processing unit generates the second signal that includes at least one piece of information among information regarding a channel used to transmit the first signal, a transmission length of the second signal, a transmission length of the first signal, and the number of times the second signal is repeated.

(5-1) The communication device according to (5), wherein
   the second signal processing unit generates the second signal that further includes information regarding connection to the communication device.

(6) The communication device according to any one of (1) to (5), wherein
   the communication unit generates an OFDM signal in which the first and second signals are disposed at different channels.

(6-1) The communication device according to (6), wherein
   the first and second signals are individually subjected to subcarrier modulation, mapping on a frequency axis is performed for each subcarrier, and the first and second signals are generated as one OFDM signal.

(6-2) The communication device according to (6), wherein
   the first and second signals are subjected to subcarrier modulation in units of channels and the first and second signals are allocated to each channel.

(7) The communication device according to any one of (1) to (6), wherein
the communication unit generates an OFDM signal in which the second signal is disposed at one channel or a plurality of channels.

(8) The communication device according to (7), wherein
the communication unit generates the OFDM signal in which the second signal is disposed by the number of channels determined based on transmission power information.

(9) The communication device according to (8), wherein
the number of channels at which the second signal is disposed is determined based on a ratio of maximum transmission power information of the communication unit to transmission power information necessary for the first signal.

(10) The communication device according to any one of (7) to (9), wherein
the communication unit transmits the OFDM signal in which a null signal is disposed at a channel or a time period in the channel at which none of the first and second signals is disposed.

(11) The communication device according to any one of (7) to (10), wherein
the communication unit transmits the OFDM signal in which the second signal is repeatedly disposed while switching a channel position at each time in one OFDM signal.

(11-1) The communication device according to (11), wherein
although a transmission time of the first signal is sufficiently long and the second signal is transmitted a plurality of times, the communication unit transmits the OFDM signal in which the second signal is repeatedly disposed when the transmission time of the first signal does not expire.

(12) The communication device according to (11), wherein
the communication unit transmits the OFDM signal in which a null signal is disposed at a channel or a time period in the channel at which none of the first and second signals is disposed.

(13) The communication device according to any one of (1) to (4), wherein
the communication unit transmits one wireless signal in which the first signal is broad-banded after end of the transmission of the second signal.

(14) The communication device according to (13), wherein,
based on capability information of another communication device which is a destination of the first signal, it is determined whether one wireless signal in which the first signal is broad-banded after the end of the transmission of the second signal is transmitted.

(15) The communication device according to (13) or (14), wherein
the capability information includes information regarding a band in which the other communication device can broad-band and receive the first signal.

(15-1) The communication device according to (13) or (14), wherein
the capability information includes information indicating whether one wireless signal in which the first signal is broadly banded can be received after the other communication device ends the transmission of the second signal.

(16) The communication device according to any one of (13) to (15), wherein
the communication unit generates a wireless signal including at least one of information indicating the broad-banding and a transmission length of the first signal before the broad-banding (or information regarding a time at which the transmission of the broad-banded first signal starts) in the first signal before the broad-banding.

(17) The communication device according to any one of (13) to (16), wherein
the communication unit generates a wireless signal including at least one of information regarding a band used for the broad-banding and a transmission length of the first signal after the broad-banding in the first signal before the broad-banding.

(18) A communication method including:
a first signal-processing step of generating a first signal;
a second signal-processing step of generating a second signal including information regarding the first signal; and
a communication step of simultaneously transmitting the first and second signals.

(19) A communication device including:
a communication unit configured to transmit and receive a wireless signal at one of a plurality of frequency channels;
a control unit configured to control switching a channel to be transmitted and received by the communication unit;
a second processing unit configured to process a second signal received from another communication device and acquire information regarding a usage channel of the other communication device; and
a first processing unit configured to process a first signal received from the other communication device and acquire information regarding the other communication device,
wherein the control unit performs standby of the first signal at the usage channel specified based on the second signal.

(20) A communication method including:
processing a second signal received from another communication device and acquiring information regarding a usage channel of the other communication device;
performing standby of a first signal at the usage channel specified based on the second signal; and
processing the first signal received from the other communication device and acquiring information regarding the other communication device.

REFERENCE SIGNS LIST

200 Communication device
201 Antenna
202 Wireless communication unit
203 Control unit
204 Signal processing unit
205 Beacon signal generation unit
206 Data processing unit
207 Discovery signal generation unit
301, 311 Encoding unit
302, 312 Interleaver
303 Subcarrier modulation unit
304 IFFT unit
305 Guard interval insertion unit
306 Symbol shaping unit
401, 411 Encoding unit
402, 412 Interleaver
403, 413 Subcarrier modulation unit 404 Channel mapping unit
405 IFFT unit
406 Guard interval insertion unit
407 Symbol shaping unit
500 Communication device
501 Antenna
502 Wireless communication unit
503 Control unit
504 Signal processing unit
505 Beacon signal processing unit
506 Data processing unit
507 Discovery signal processing unit
601 Automatic gain control processing unit
602 Guard interval removing unit
603 FFT unit
604 Subcarrier demodulation unit
605 Deinterleaver
606 Decoding unit

The invention claimed is:

1. A communication device comprising:
a control circuit configured to:
   generate a beacon signal, and
   generate a discovery signal,
   wherein the discovery signal includes each of:
      information that identifies a channel, of at least two channels, used to repeatedly transmit the beacon signal,
      a transmission length of the discovery signal,
      a transmission length of the beacon signal, and
      a number of times the discovery signal is repeated; and
a communication circuit configured to:
   simultaneously transmit, at a first time, the beacon first and discovery signals as one wireless signal in respective channels of the at least two channels, and
   in accordance with the discovery signal, retransmit the beacon signal without the discovery signal in the identified channel at a second time after the first time.

2. The communication device according to claim 1, wherein
   the at least two channels comprises at least three channels, and
   based on the number of times the discovery signal is repeated being greater than zero, the discovery signal is repeated across a plurality of channels of the at least three channels other than the channel identified for the beacon signal.

3. The communication device according to claim 2, wherein
   the control circuit is configured to determine the number of times the discovery si nal is repeated across the plurality of channels of the at least three channels other than the channel identified for the beacon signal based on a ratio of a maximum transmission power of the communication circuit to a transmission power information set for the beacon signal.

4. The communication device according to claim 3, wherein
   based on the ratio being equal to 1, the beacon signal is transmitted in the identified channel, and the discovery channel is transmitted without a null signal in the plurality of channels of the at least three channels other than the channel identified for the beacon signal, and
   based on the ratio being less than 1, the beacon signal is transmitted in the identified channel, and the discovery channel is transmitted with a null signal in the plurality of channels of the at least three channels other than the channel identified for the beacon signal.

5. The communication device according to claim 1, wherein
   based on capability information of another communication device which is a destination of the beacon signal, the communication circuit transmits an other wireless signal in which the beacon signal is broad-banded after an end of the transmission of the discovery signal.

6. The communication device according to claim 5, wherein
   the capability information includes information regarding a band in which the other communication device is capable of broad-banding and receiving the beacon signal.

7. The communication device according to claim 5, wherein
   the communication circuit generates and transmits a wireless signal including information indicating the broad-banding and a transmission length of the broad-banded beacon signal before the broad-banding of the beacon signal.

8. The communication device according to claim 5, wherein
   the communication circuit generates a wireless signal including information regarding a band used for the broad-banding and a transmission length of the broad-banded beacon signal before the broad-banding of the beacon signal.

9. A communication method performed by a communication device, the method comprising:
   generating a beacon signal;
   generating a discovery signal,
   wherein the discovery signal includes each of:
      information that identifies a channel, of at least two channels, used to transmit the beacon signal,
      a transmission length of the discovery signal,
      a transmission length of the beacon signal, and
      a number of times the discovery signal is repeated,
   simultaneously transmitting, at a first time, the beacon and discovery signals as one wireless signal in respective channels of the at least two channels; and
   in accordance with the discovery signal, retransmitting the beacon signal without the discovery signal in the identified channel at a second time after the first time.

10. A communication device comprising:
a communication circuit configured to:
   receive, at a first time, one wireless signal that comprises at least two channels,
      wherein the one wireless signal comprises a beacon signal and a discovery signal in respective channels of the at least two channels,
      wherein the discovery signal includes each of:
         information that identifies the channel, of the at least two channels, used to transmit the beacon signal,
         a transmission length of the discovery signal,
         a transmission length of the beacon signal, and
         a number of times the discovery signal is repeated, and
      based on the discovery signal, receive a retransmission of only the beacon signal in the identified channel at a second time after the first time.

11. A communication method performed by a communication device, the method comprising:
   receiving, at a first time, one wireless signal that comprises at least two channels, wherein the one wireless signal comprises a beacon signal and a discovery signal in respective channels of the at least two channels,
wherein the discovery signal includes each of:
 information that identifies the channel, of the at least two channels, used to transmit the beacon signal,
 a transmission length of the discovery signal,
 a transmission length of the beacon signal, and
 a number of times the discovery signal is repeated, and
based on the discovery signal, receiving a retransmission of only the beacon signal in the identified channel at a second time after the first time.

\* \* \* \* \*